(12) United States Patent
Imade

(10) Patent No.: US 9,338,364 B2
(45) Date of Patent: May 10, 2016

(54) IMAGING DEVICE AND IMAGE GENERATION METHOD

(71) Applicant: OLYMPUS CORPORATION, Tokyo (JP)

(72) Inventor: Shinichi Imade, Iruma (JP)

(73) Assignee: OLYMPUS CORPORATION, Tokyo (JP)

(*) Notice: Subject to any disclaimer, the term of this patent is extended or adjusted under 35 U.S.C. 154(b) by 84 days.

(21) Appl. No.: 14/087,562

(22) Filed: Nov. 22, 2013

(65) Prior Publication Data

US 2014/0078346 A1 Mar. 20, 2014

Related U.S. Application Data

(63) Continuation of application No. PCT/JP2012/061099, filed on Apr. 25, 2012.

(30) Foreign Application Priority Data

Jul. 8, 2011 (JP) .................................. 2011-151722

(51) Int. Cl.
*H04N 5/225* (2006.01)
*H04N 9/68* (2006.01)
*H04N 5/238* (2006.01)
*H04N 5/235* (2006.01)
(Continued)

(52) U.S. Cl.
CPC ............ *H04N 5/2351* (2013.01); *G06T 3/4053* (2013.01); *H04N 5/23232* (2013.01); *H04N 5/349* (2013.01); *H04N 9/045* (2013.01)

(58) Field of Classification Search
None
See application file for complete search history.

(56) References Cited

U.S. PATENT DOCUMENTS 5,402,171 A * 3/1995 Tagami et al. ............. 348/219.1
6,466,253 B1 * 10/2002 Honjoh ................. H04N 5/217
348/169
(Continued)

FOREIGN PATENT DOCUMENTS

EP 1 357 514 A1 10/2003
EP 1357514 * 10/2003
(Continued)

OTHER PUBLICATIONS

International Search Report dated Jul. 17, 2012 issued in PCT/JP2012/061099.
(Continued)

*Primary Examiner* — Lin Ye
*Assistant Examiner* — Euel Cowan
(74) *Attorney, Agent, or Firm* — Scully, Scott, Murphy & Presser, PC

(57) ABSTRACT

The image conversion section calculates luminance values and color difference values based on pixel values of the captured image that respectively correspond to a plurality of colors, and outputs a luminance image formed by the calculated luminance values and a color difference image formed by the calculated color difference values. The estimation calculation section calculates an estimated luminance value of each pixel of a high-resolution image based on the luminance image, and calculates an estimated color difference value of each pixel of the high-resolution image based on the color difference image. The pixel value conversion section converts the estimated luminance value and the estimated color difference value into RGB pixel values of each pixel of the high-resolution image.

13 Claims, 29 Drawing Sheets

(51) Int. Cl.
*H04N 5/349* (2011.01)
*H04N 9/04* (2006.01)
*G06T 3/40* (2006.01)
*H04N 5/232* (2006.01)

(56) References Cited

U.S. PATENT DOCUMENTS

2003/0227552 A1  12/2003  Watanabe
2008/0112644 A1   5/2008  Yokohata et al.
2009/0297063 A1*  12/2009  Camp et al. .................. 382/294

FOREIGN PATENT DOCUMENTS

| JP | 2001-169301 A | 6/2001 |
| JP | 2003-338988 A | 11/2003 |
| JP | 2008-243037 A | 10/2008 |
| JP | 2009-115074 A | 5/2009 |
| JP | 2009-124621 A | 6/2009 |
| JP | 2010-34964 A | 2/2010 |

OTHER PUBLICATIONS

Extended Supplementary European Search Report dated Jan. 22, 2015 from related European Application No. 12 81 1703.3.

* cited by examiner

INTERMEDIATE ESTIMATED PIXEL

INTERMEDIATE ESTIMATED PIXEL

FINAL ESTIMATED PIXEL

INTERMEDIATE ESTIMATED PIXEL

US 9,338,364 B2

IMAGING DEVICE AND IMAGE GENERATION METHOD

CROSS REFERENCE TO RELATED APPLICATION

This application is a continuation of International Patent Application No. PCT/JP2012/061099, having an international filing date of Apr. 25, 2012, which designated the United States, the entirety of which is incorporated herein by reference. Japanese Patent Application No. 2011-151722 filed on Jul. 8, 2011 is also incorporated herein by reference in its entirety.

BACKGROUND

The present invention relates to an imaging device, an image generation method, and the like.

A pixel shift method (see JP-A-2009-115074, for example) has been known as a high-resolution method that generates an image having a resolution higher than that of the captured image. The pixel shift method sequentially and mechanically shifts the image sensor, and captures an image each time the image sensor is shifted. A high-resolution image is synthesized from a plurality of captured images (see JP-A-2009-124621 and JP-A-2008-243037, for example).

SUMMARY

According to one aspect of the invention, there is provided an imaging device comprising:

an image sensor that includes an array of pixels that respectively correspond to a plurality of colors;

an imaging control section that performs a control process that acquires a captured image while sequentially shifting a position of an object image on the image sensor by a shift amount that is smaller than a pixel pitch of the image sensor;

an image conversion section that calculates luminance values and color difference values based on pixel values of the acquired captured image that respectively correspond to the plurality of colors, and outputs a luminance image formed by the calculated luminance values and a color difference image formed by the calculated color difference values;

an estimation calculation section that calculates an estimated luminance value of each pixel of a high-resolution image having a resolution higher than a resolution obtained by the pixel pitch of the image sensor based on the luminance image, and calculates an estimated color difference value of each pixel of the high-resolution image based on the color difference image; and a pixel value conversion section that converts the estimated luminance value and the estimated color difference value into RGB pixel values of each pixel of the high-resolution image.

According to another aspect of the invention, there is provided an image generation method comprising:

acquiring a captured image while sequentially shifting a position of an object image on an image sensor by a shift amount that is smaller than a pixel pitch of the image sensor, the image sensor including an array of pixels that respectively correspond to a plurality of colors;

calculating luminance values and color difference values based on pixel values of the captured image that respectively correspond to the plurality of colors, and outputting a luminance image formed by the calculated luminance values and a color difference image formed by the calculated color difference values;

calculating an estimated luminance value of each pixel of a high-resolution image having a resolution higher than a resolution obtained by the pixel pitch based on the luminance image, and calculating an estimated color difference value of each pixel of the high-resolution image based on the color difference image; and converting the estimated luminance value and the estimated color difference value into RGB pixel values of each pixel of the high-resolution image.

DESCRIPTION OF EXEMPLARY EMBODIMENTS

Figure 1:
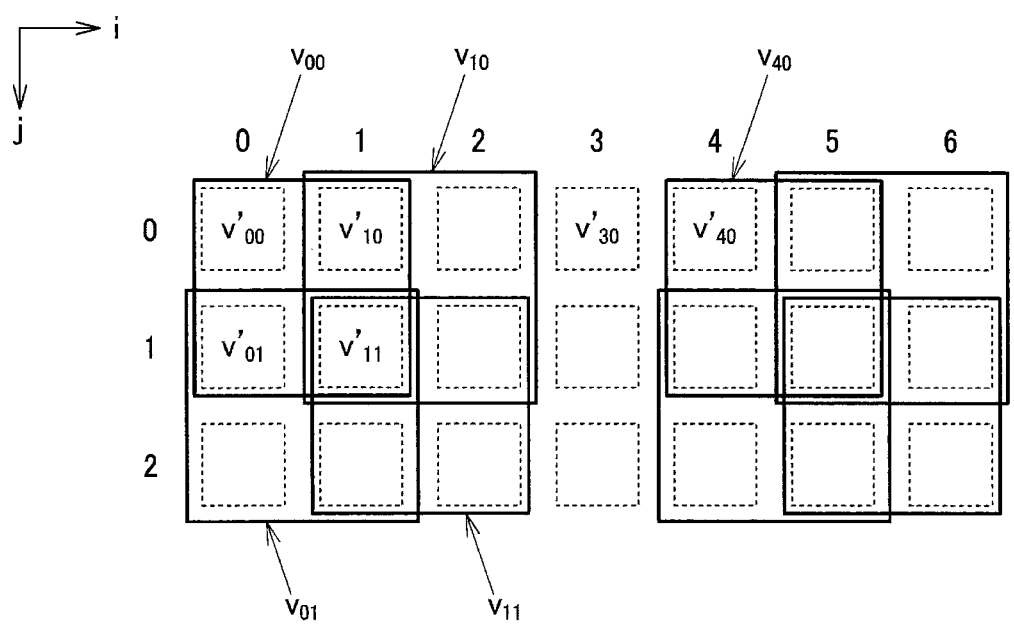
FIG. 1 illustrates a comparative example.

Several embodiments of the invention may provide an imaging device, an image generation method, and the like that can improve the color estimation accuracy when performing a high-resolution process.

According to one embodiment of the invention, there is provided an imaging device comprising:

an image sensor that includes an array of pixels that respectively correspond to a plurality of colors;

an imaging control section that performs a control process that acquires a captured image while sequentially shifting a position of an object image on the image sensor by a shift amount that is smaller than a pixel pitch of the image sensor;

an image conversion section that calculates luminance values and color difference values based on pixel values of the acquired captured image that respectively correspond to the plurality of colors, and outputs a luminance image formed by the calculated luminance values and a color difference image formed by the calculated color difference values;

an estimation calculation section that calculates an estimated luminance value of each pixel of a high-resolution image having a resolution higher than a resolution obtained by the pixel pitch of the image sensor based on the luminance image, and calculates an estimated color difference value of each pixel of the high-resolution image based on the color difference image; and a pixel value conversion section that converts the estimated luminance value and the estimated color difference value into RGB pixel values of each pixel of the high-resolution image.

According to one embodiment of the invention, a captured image is acquired while sequentially shifting the position of the object image by the shift amount that is smaller than the pixel pitch, and the luminance image and the color difference image are calculated based on the captured image. The estimated luminance value and the estimated color difference value of each pixel of the high-resolution image are calculated based on the luminance image and the color difference image, and converted into the RGB pixel values. This makes it possible to improve the color estimation accuracy of the high-resolution process.

Exemplary embodiments of the invention are described in detail below. Note that the following exemplary embodiments do not in any way limit the scope of the invention defined by the claims laid out herein. Note also that all of the elements described below in connection with the following exemplary embodiments should not necessarily be considered to be the essential elements of the invention.

1. Outline

An outline of several embodiments of the invention is described below. According to several embodiments of the invention, the positional relationship (relative positions) of an object image and an image sensor is mechanically shifted, and an image having a resolution higher than the captured image is estimated using a plurality of images obtained by the shift (see FIG. 2).

For example, JP-A-2009-124621 discloses a method that synthesizes a plurality of low-resolution images obtained by a pixel shift to estimate a high-resolution image, and performs a super-resolution process on the estimated high-resolution image to estimate a high-resolution image with high likelihood.

However, the method disclosed in JP-A-2009-124621 utilizes a normal super-resolution process (e.g., ML method, MAP method, POCS method, or IBP method) that increases the estimation accuracy by repeated calculations using a two-dimensional filter. Therefore, it is difficult to apply the method disclosed in JP-A-2009-124621 to an instrument such as a digital camera that is limited in terms of processing capacity and cost due to a significant increase in the amount of processing.

In JP-A-2008-243037, the pixel value of a sub-pixel (i.e., a pixel of the desired high-resolution image) is estimated so that the average value of the pixel values of the sub-pixels coincides with the pixel value of the captured low-resolution image. The pixel value is estimated by setting the initial value of a plurality of sub-pixels, subtracting the pixel value of each sub-pixel other than the calculation target sub-pixel from the pixel value of the low-resolution image to calculate a pixel value, and sequentially applying the calculated pixel value to the adjacent pixels.

However, the method disclosed in JP-A-2008-243037 has a problem in that an estimation error increases to a large extent when an area appropriate for setting the initial value cannot be found from the captured image, and the initial value cannot be successfully specified. Moreover, it is necessary to perform a process that searches an area appropriate for setting the initial value.

Figure 19A:
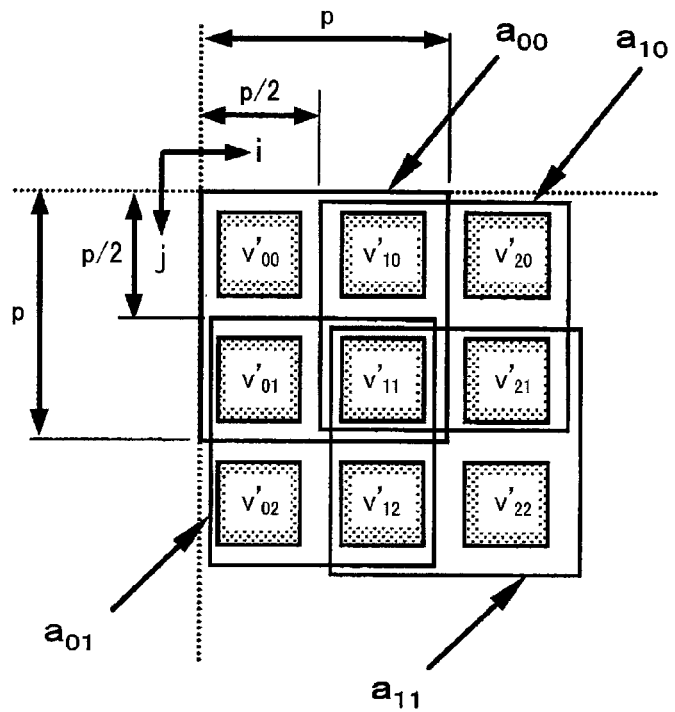
FIGS. 19A and 19B are views illustrating an estimated pixel value and an intermediate pixel value.

According to several embodiments of the invention, an estimated pixel value is expressed by a relational expression using the pixel value of the captured image, and determined so that an error between the relational expression and the pixel value is minimized (see FIG. 19A). The estimated pixel value is the pixel value of the desired high-resolution image.

According to the above configuration, it is unnecessary to employ a normal super-resolution process, an initial value search process, and the like, and a high-resolution image can be estimated from the shifted images using a simple process. Since a high-resolution image can be obtained from a movie, the user can designate an arbitrary timing, and easily obtain an image at the best moment.

FIG. 1 illustrates a comparative example. FIG. 1 illustrates an example in which the estimation process according to the embodiments of the invention is performed using R images obtained by a minimum pixel shift ($v_{00}$ and $v_{40}$ are R pixels of a Bayer array). 2×2 pixels $v'_{00}$, $v'_{10}$, $v'_{11}$, and $v'_{01}$ are estimated from the pixel $v_{00}$ by the estimation process. When using a ½ pixel shift, the shifted pixels $v_{10}$, $v_{11}$, and $v_{01}$ correspond to 3×3 pixels of the high-resolution image. Since one pixel is present between the pixel $v_{10}$ and the R pixel $v_{40}$ adjacent thereto, an area (e.g., $v'_{30}$) in which the R color information cannot be obtained occurs. In this case, the pixel value is calculated by interpolation from peripheral R pixels.

Specifically, since it is necessary to perform an interpolation process on the estimated high-resolution image when applying the estimation process according to the embodiments of the invention directly to a Bayer image, the color component estimation accuracy deteriorates (e.g., a false color occurs).

Figure 3:
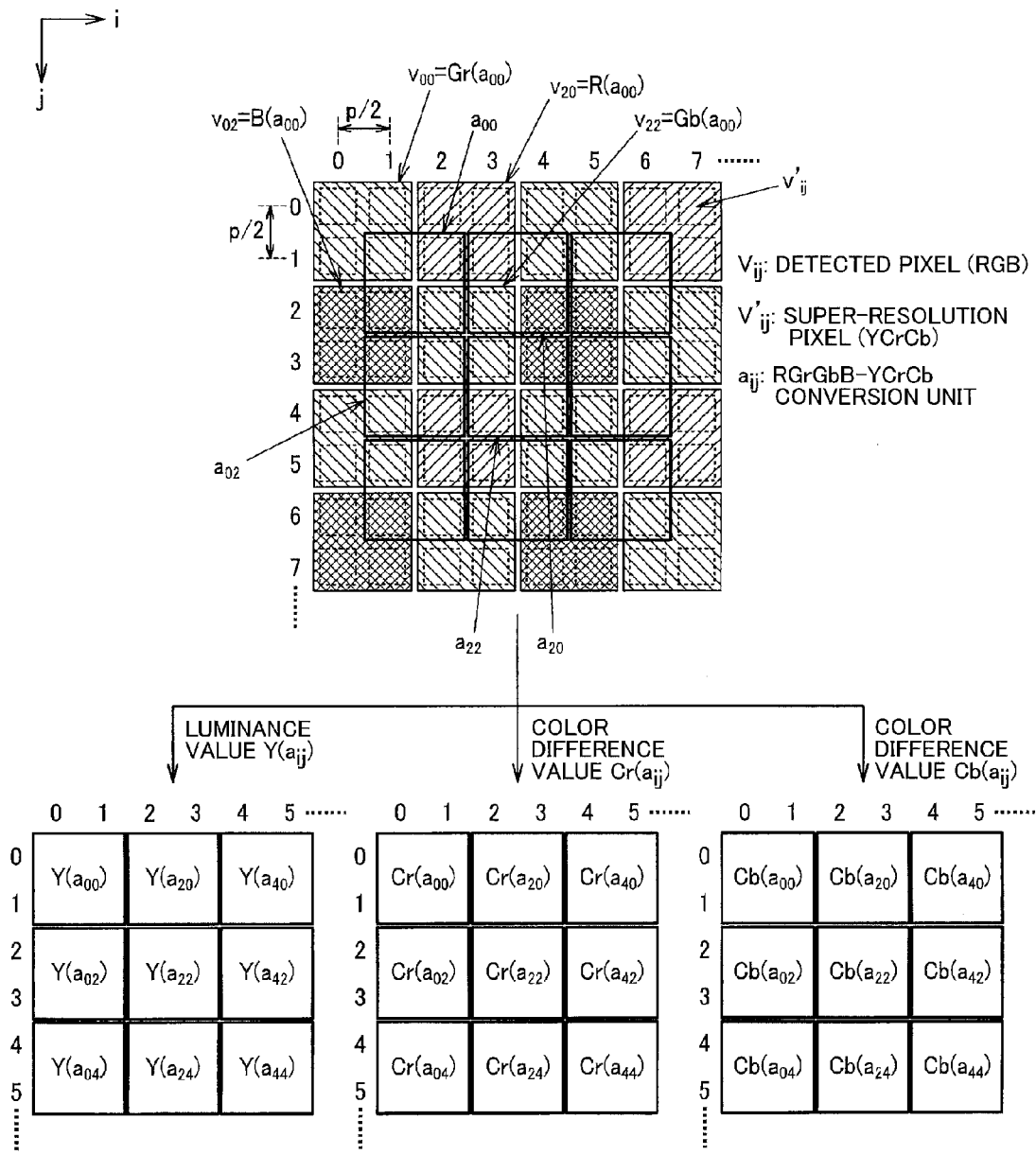
FIG. 3 is a view illustrating a YCrCb conversion method according to the first estimation method.

According to the embodiments of the invention, a Bayer image is subjected to a ½ pixel overlap shift in the horizontal direction or the vertical direction to acquire four images, and a luminance image and a color difference image are generated from each image (see FIG. 3 and the like). A restoration estimation process is applied to the generated four luminance images to estimate a luminance image having a resolution four times that of the Bayer image. The estimation process is similarly applied to the color difference images. The YCrCb values of the estimated image are inversely converted into the RGB values to calculate a high-resolution RGB image.

According to the above configuration, since the YCrCb values are estimated for each pixel of the high-resolution image, the color components can be calculated without using interpolation. This makes it possible to improve the RGB pixel value estimation accuracy, and suppress occurrence of a false color and the like.

2. First Estimation Method

A first estimation method that calculates YCrCb values on a basis of four adjacent pixels is described below. A pixel shift is described below with reference to FIG. 2.

Figure 2:
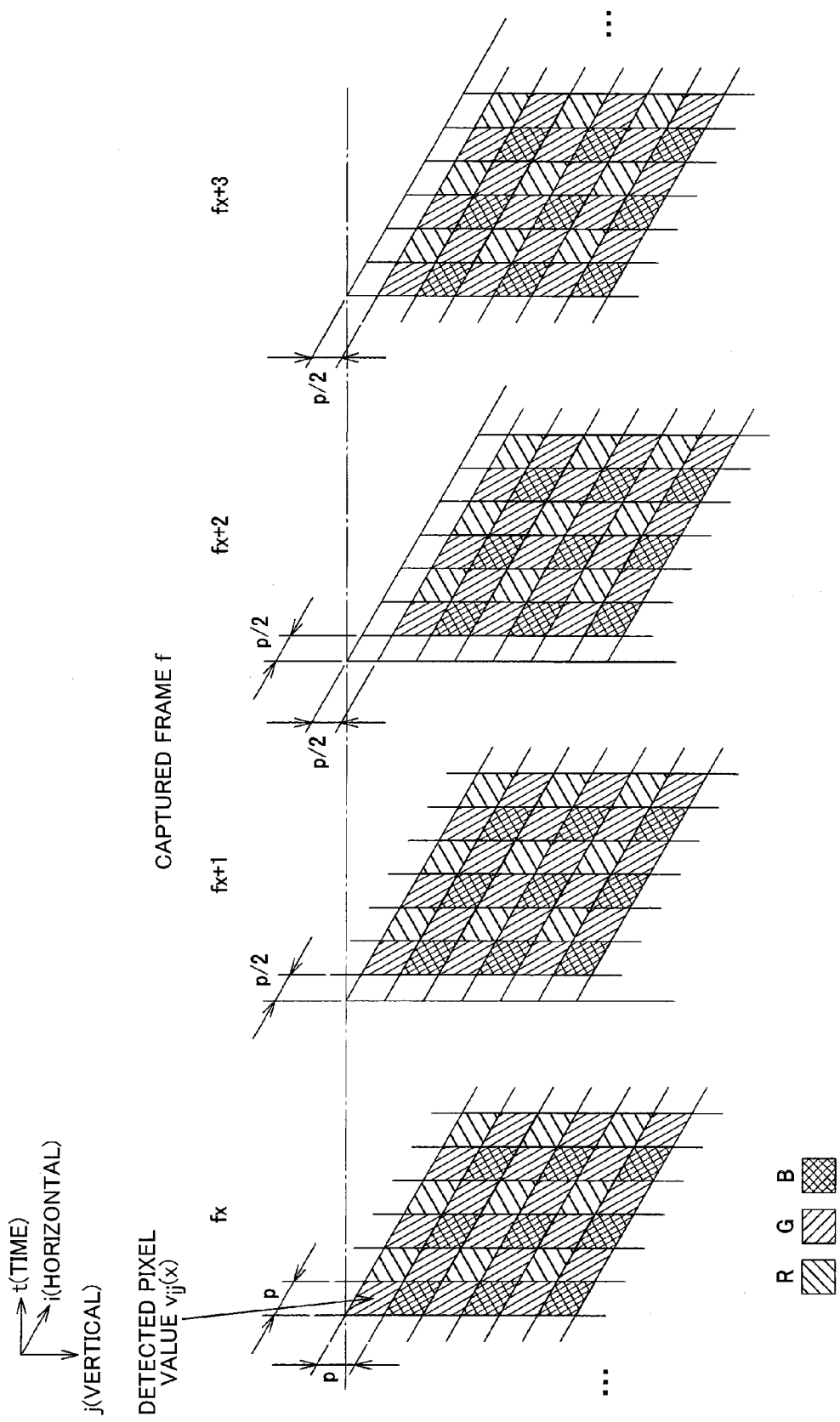
FIG. 2 is a view illustrating a pixel shift according to the first estimation method.

As illustrated in FIG. 2, a pixel shift is sequentially performed in a first frame fx to a fourth frame fx+3 (x is a natural number). The pixel shift is implemented by mechanically shifting the relative positions of the object image and the image sensor. When the pixel pitch of the image sensor is p, the shift amount is p/2. The pixel shift is performed in the horizontal direction and the vertical direction. The horizontal direction is a direction along the horizontal scan direction of the image sensor, and the vertical direction is a direction along the vertical scan direction of the image sensor, for example.

An RGB-YCrCb conversion method is described below with reference to FIG. 3. In FIG. 3, $v_{ij}$ is an R (red), Gr (green), Gb (green), or B (blue) pixel (or pixel value). $v'_{ij}$ is a super-resolution pixel (or super-resolution pixel value) among 2×2 super-resolution pixels that virtually form the pixel $v_{ij}$.

As illustrated in FIG. 3, four adjacent pixels {R, Gr, Gb, r, Gb, B} that are enclosed by a square thick frame are processed as a processing unit $a_{ij}$, and the pixel values within the processing unit $a_{ij}$ are converted in a luminance value $Y(a_{ij})$, a color difference value $Cr(a_{ij})$, and a color difference value $Cb(a_{ij})$. The luminance value $Y(a_{ij})$, the color difference value $Cr(a_{ij})$, and the color difference value $Cb(a_{ij})$ are calculated by the following expression (1).

$$Y(a_{ij})=\alpha_y \cdot R(a_{ij})+\beta_y \cdot [Gr(a_{ij})+Gb(a_{ij})]/2+\gamma_y \cdot B(a_{ij})$$

$$Cr(a_{ij})=\alpha_r \cdot R(a_{ij})+\beta_r \cdot [Gr(a_{ij})+Gb(a_{ij})]/2+\gamma_r \cdot B(a_{ij})$$

$$Cb(a_{ij})=\alpha_b \cdot R(a_{ij})+\beta_b \cdot [Gr(a_{ij})+Gb(a_{ij})]/2+\gamma_b \cdot B(a_{ij}) \quad (1)$$

where, $\{\alpha_y, \beta_y, \gamma_y\}$, $\{\alpha_r, \beta_r, \gamma_r\}$, and $\{\alpha_b, \beta_b, \gamma_b\}$ are conversion coefficients. For example, known RGB-YCrCb conversion coefficients may be used as the conversion coefficients $\{\alpha_y, \beta_y, \gamma_y\}$, $\{\alpha_r, \beta_r, \gamma_r\}$, and $\{\alpha_b, \beta_b, \gamma_b\}$. $R(a_{ij})$, $Gr(a_{ij})$, $Gb(a_{ij})$, and $B(a_{ij})$ are pixel values $\{v_{ij}\}$ corresponding to the respective colors included in the processing unit $a_{ij}$.

An image formed by the luminance values $Y(a_{ij})$ obtained from the captured image in the first frame fx is referred to as "first luminance Y image", an image formed by the color difference value $Cr(a_{ij})$ obtained from the captured image in the first frame fx is referred to as "first color difference Cr image", and an image formed by the color difference value $Cb(a_{ij})$ obtained from the captured image in the first frame fx is referred to as "first color difference Cb image". The luminance image and the color difference images are handled as one image group.

Figure 4:
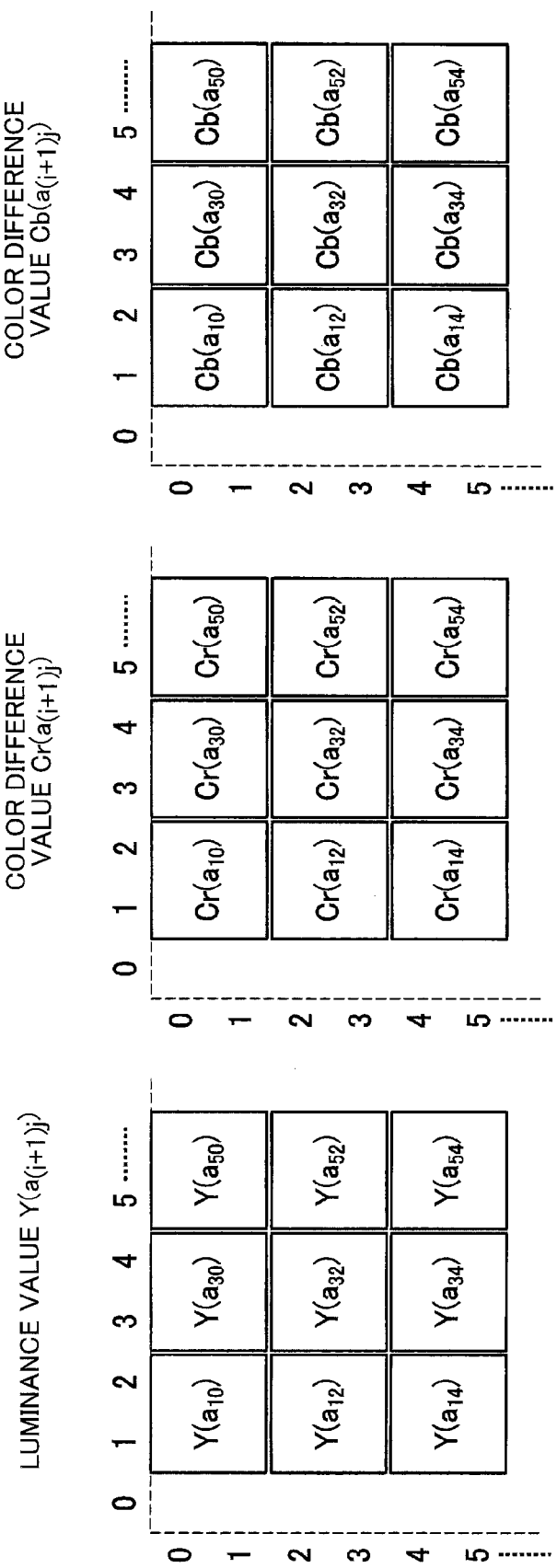
FIG. 4 is a view illustrating a YCrCb conversion method according to the first estimation method.
Figure 5:
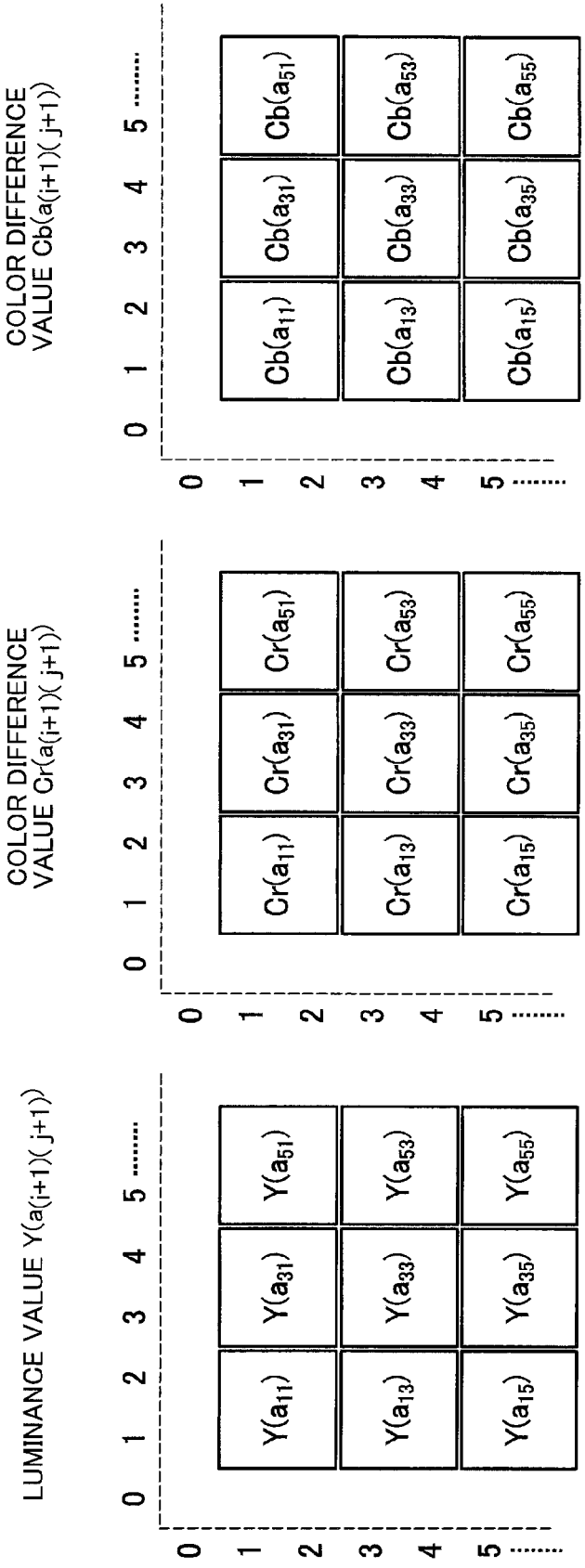
FIG. 5 is a view illustrating a YCrCb conversion method according to the first estimation method.
Figure 6:
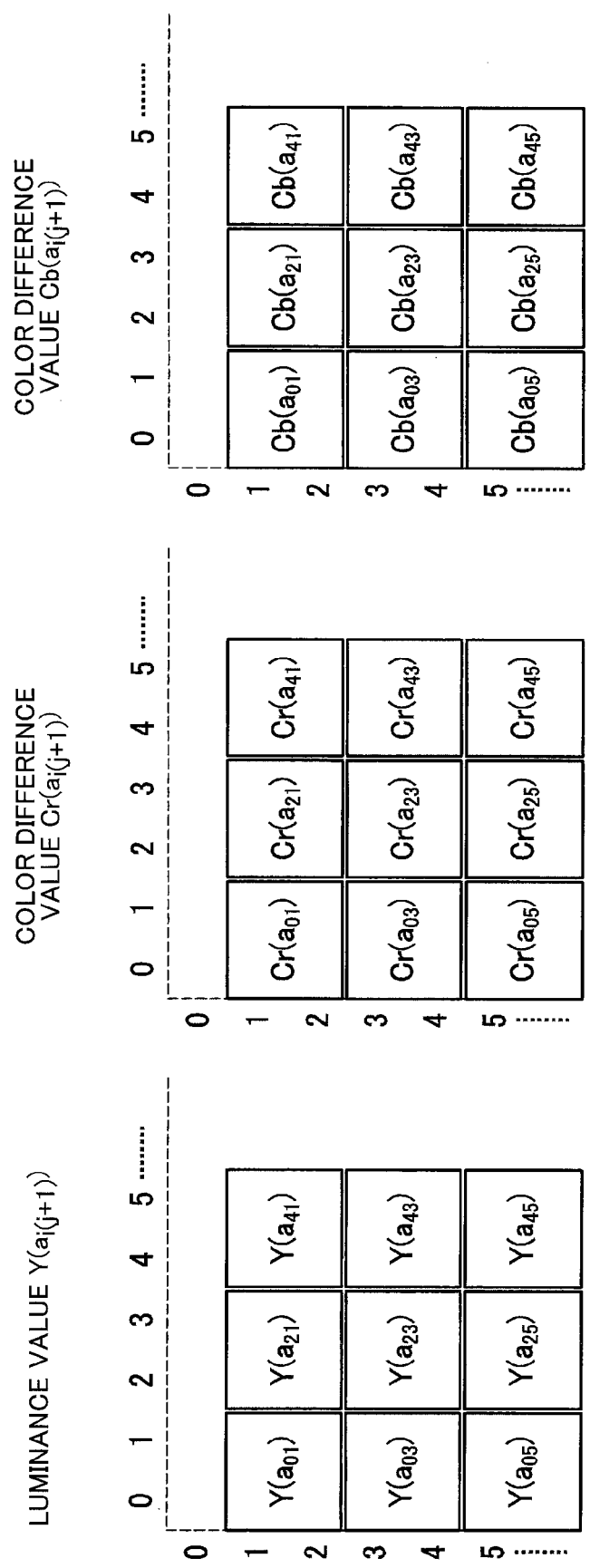
FIG. 6 is a view illustrating a YCrCb conversion method according to a first estimation method.
Figure 7A:
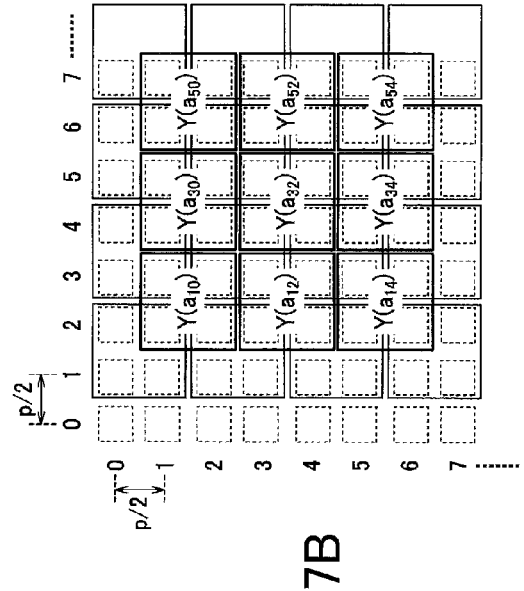
FIGS. 7A to 7D illustrate examples of luminance values obtained by a ½ pixel shift in the horizontal direction or the vertical direction.
Figure 7B:
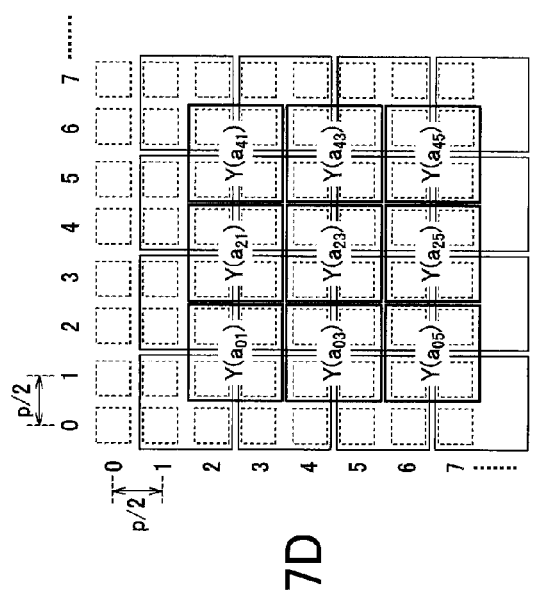
Figure 7C:
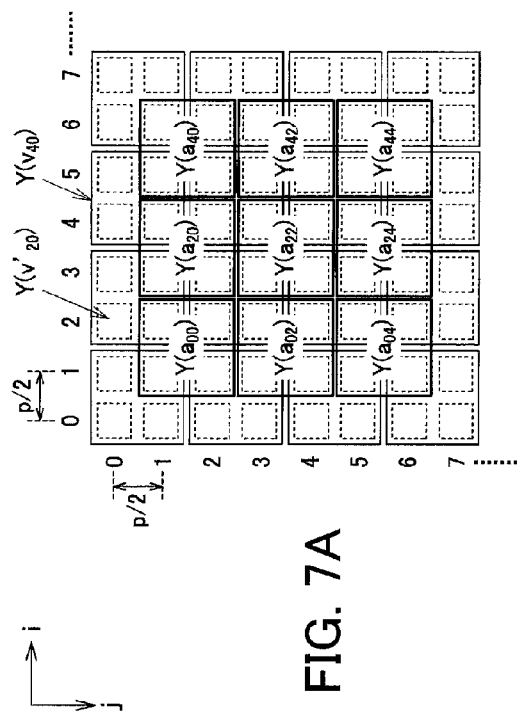
Figure 7D:
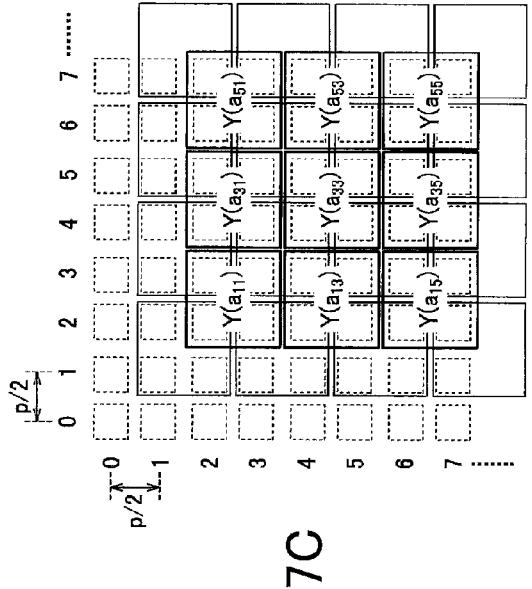

As illustrated in FIGS. 4 to 6, images formed by the luminance values $Y(a_{ij})$ respectively obtained from the captured images in the second frame fx+1, the third frame fx+2, and the fourth frame fx+3 are respectively referred to as "second luminance Y image", "third luminance Y image", and "fourth luminance Y image", images formed by the color difference value $Cr(a_{ij})$ respectively obtained from the captured images in the second frame fx+1, the third frame fx+2, and the fourth frame fx+3 are respectively referred to as "second color difference Cr image", "third color difference Cr image", and "fourth color difference Cr image", and images formed by the color difference value $Cb(a_{ij})$ respectively obtained from the captured images in the second frame fx+1, the third frame fx+2, and the fourth frame fx+3 are respectively referred to as "second color difference Cb image", "third color difference Cb image", and "fourth color difference Cb image".

A method that estimates a high-resolution image from the resulting luminance images and color difference images is described below. As illustrated in FIGS. 7A to 7D, the luminance values $Y(a_{ij})$ are calculated while performing a ½ pixel shift in the horizontal or the vertical direction.

The resulting luminance values $Y(a_{ij})$ are considered to be the overlap-shift 4-pixel addition values of the virtual super-resolution pixels $v'_{ij}$. An estimation process described later with reference to FIG. 19A and the like is applied to the luminance values $Y(a_{ij})$ to calculate luminance values $Y(v'_{ij})$ corresponding to a pixel size half of that of the pixels $v_{ij}$ as estimated values. For example, the estimation process is applied using the luminance values $Y(a_{00}), Y(a_{10}), Y(a_{01})$, and $Y(a_{11})$ as the pixels values $a_{00}, a_{10}, a_{01}$, and $a_{11}$ illustrated in FIG. 19A. The luminance value $Y(a_{00})$ is considered to be the addition values of the luminance values $Y(v'_{00})$, $Y(v'_{10})$, $Y(v'_{01})$, and $Y(v''_{11})$ of the high-resolution image. A second high-resolution estimation process described later with reference to FIG. 20A and the like, or a third high-resolution estimation process described later with reference to FIG. 29A and the like may be applied to the luminance values $Y(a_{ij})$. In this case, the pixel shift is performed by an arbitrary shift amount s that is smaller than the width d of the aperture of the pixel of the image sensor, and the luminance values $Y(v'_{ij})$ corresponding to a pixel size that is s/pth of that of the original pixels $v_{ij}$ are calculated as estimated values corresponding to the shift amount s.

Note that the estimation process is similarly applied to the color difference values $Cr(a_{ij})$ and the color difference values $Cb(a_{ij})$ to calculate the color difference values $Cr(v'_{ij})$ and the color difference values $Cb(v'_{ij})$ of the super-resolution pixels $v'_{ij}$.

Figure 8:
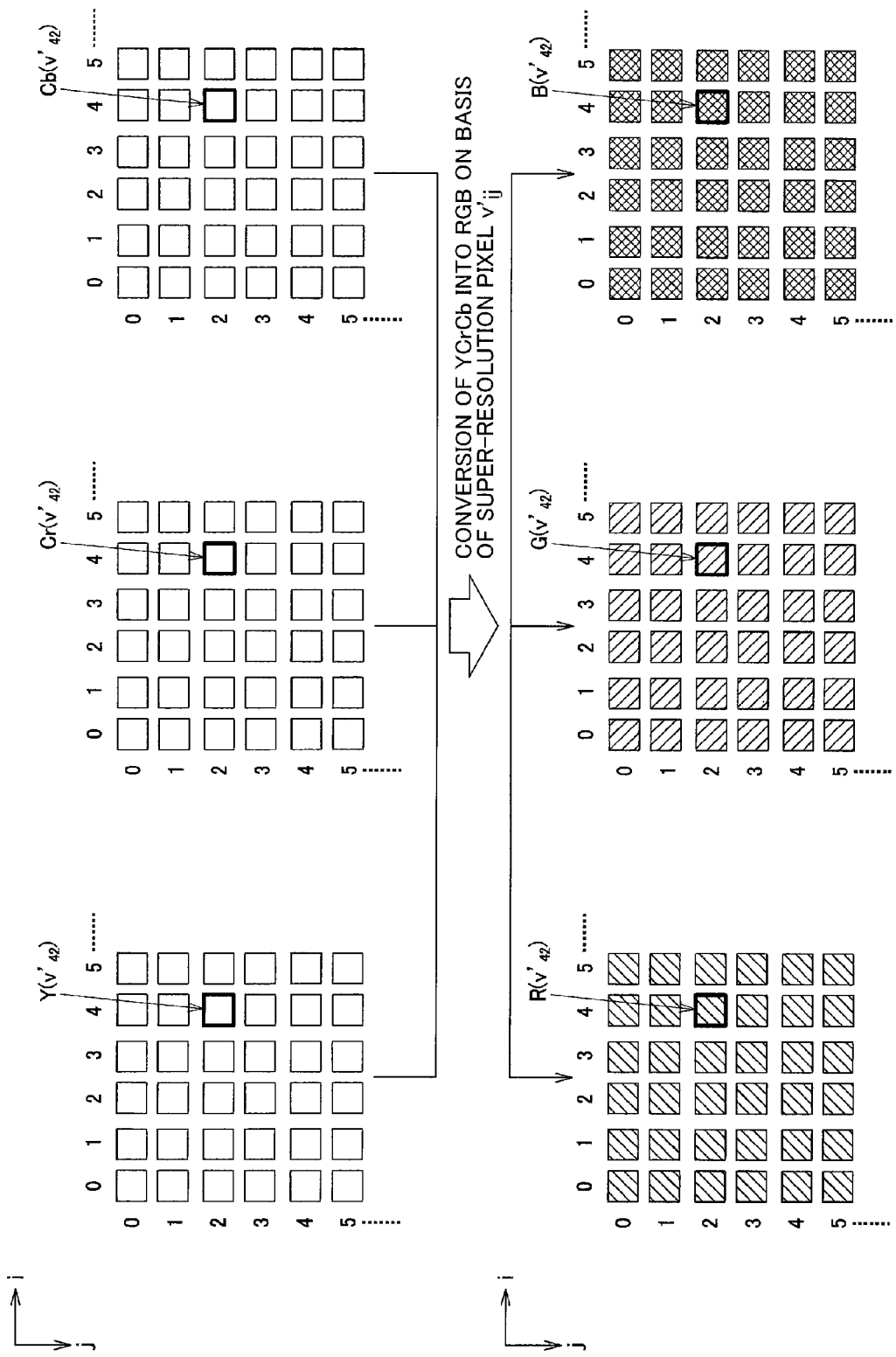
FIG. 8 is a view illustrating a YCrCb-RGB conversion method.

As illustrated in FIG. 8, the luminance value $Y(v'_{ij})$, the color difference value $Cr(v'_{ij})$, and the color difference value $Cb(v'_{ij})$ are calculated corresponding to each super-resolution pixel $\{v'_{ij}\}$ as a result of the estimation process. The YCrCb values are inversely converted into the RGB values using the following expression (2) to calculate the primary color values $R(v'_{ij})$, $G(v'_{ij})$, and $B(v'_{ij})$ of each super-resolution pixel $\{v'_{ij}\}$.

$$R(v'_{ij}) = \alpha'_y \cdot Y(v'_{ij}) + \beta'_y \cdot Cr(v'_{ij}) + \gamma'_y \cdot Cb(v'_{ij})$$

$$G(v'_{ij}) = \alpha'_r \cdot Y(v'_{ij}) + \beta'_r \cdot Cr(v'_{ij}) + \gamma'_r \cdot Cb(v'_{ij})$$

$$B(v'_{ij}) = \alpha'_b \cdot Y(v'_{ij}) + \beta'_b \cdot Cr(v'_{ij}) + \gamma'_b \cdot Cb(v'_{ij}) \quad (2)$$

where, $\{\alpha'_y, \beta'_y, \gamma'_y\}$, $\{\alpha'_r, \beta'_r, \gamma'_r\}$, and $\{\alpha'_b, \beta'_b, \gamma'_b\}$ are conversion coefficients. For example, known YCrCb-RGB conversion coefficients may be used as the conversion coefficients $\{\alpha'_y, \beta'_y, \gamma'_y\}$, $\{\alpha'_r, \beta'_r, \gamma'_r\}$, and $\{\alpha'_b, \beta'_b, \gamma'_b\}$.

3. Imaging Device

Figure 9:
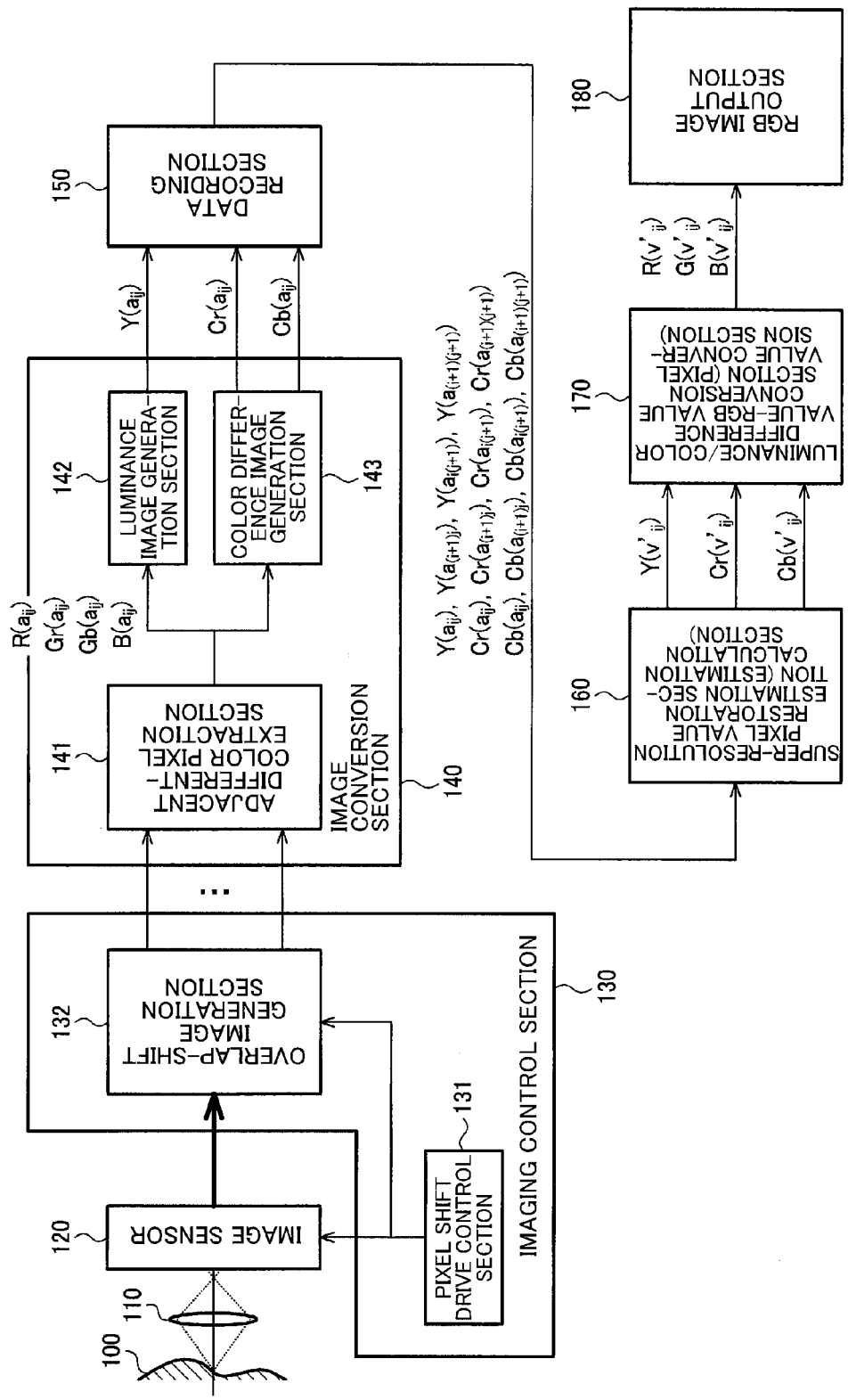
FIG. 9 illustrates a configuration example of an imaging device according to one embodiment of the invention.

FIG. 9 illustrates a configuration example of an imaging device that performs the estimation process according to one embodiment of the invention. The imaging device illustrated in FIG. 9 includes a lens 110 (imaging optical system), an image sensor 120, an imaging control section 130, an image conversion section 140, a data recording section 150, a super-resolution pixel value restoration estimation section 160 (estimation calculation section), a luminance/color difference value-RGB value conversion section 170 (pixel value conversion section), and an RGB image output section 180 (image output section).

The lens 110 forms an image of an object 100. The image sensor 120 captures the object image formed by the lens 110. The image sensor 120 is implemented by a CCD image sensor or a CMOS image sensor, for example.

The imaging control section 130 control the pixel shift, and performs an imaging operation. More specifically, the imaging control section 130 includes a pixel shift drive control section 131 and an overlap-shift image generation section 132 (image acquisition section). The pixel shift drive control section 131 controls a drive that shifts the position of the image sensor 120 or the lens 110 to implement the pixel shift. The overlap-shift image generation section 132 reads an image from the image sensor 120 corresponding to each shift to acquire an RGB Bayer image. For example, the overlap-shift image generation section 132 includes an A/D conversion section (not illustrated in FIG. 9) and the like.

The image conversion section 140 performs a process that converts the RGB values into the YCrCb values. More specifically, the image conversion section 140 includes an adjacent different-color pixel extraction section 141, a luminance image generation section 142, and a color difference image generation section 143. The adjacent different-color pixel extraction section 141 extracts a combination (conversion unit) of the RGB values $R(a_{ij})$, $Gr(a_{ij})$, $Gb(a_{ij})$, and $B(a_{ij})$ converted into the YCrCb values. The luminance image generation section 142 converts the extracted RGB values into the luminance values $Y(a_{ij})$. The color difference image generation section 143 converts the extracted RGB values into the color difference values $Cr(a_{ij})$ and the color difference values $Cb(a_{ij})$.

The data recording section 150 records the luminance images and the color difference images obtained through conversion. For example, the data recording section 150 may be a memory or the like included in the imaging device, or may be a memory, a hard disk drive, or the like provided outside the imaging device.

The super-resolution pixel value restoration estimation section 160 estimates the luminance values $Y(v'_{ij})$, the color difference values $Cr(v'_{ij})$, and the color difference values $Cb(v'_{ij})$ of the high-resolution image based on the recorded luminance images and color difference images. The luminance/color difference value-RGB value conversion section 170 converts the estimated luminance values $Y(v'_{ij})$, color difference values $Cr(v'_{ij})$, and color difference values $Cb(v'_{ij})$ into the pixel values $R(v'_{ij})$, $G(v'_{ij})$, and $B(v'_{ij})$. The RGB image output section 180 outputs a still image or a movie based on the resulting RGB high-resolution image. For example, the RGB image output section 180 outputs a high-resolution still image at the timing designated by the user. A high-resolution image may be generated in each frame, and a high-resolution movie may be output.

Although an example in which the color filters are provided in the RGB Bayer array has been described above, the configuration is not limited thereto. For example, the color filters may be complementary color filters (e.g., CMY), or may be provided in an array other than the Bayer array. Although an example in which the RGB values of 2×2 Bayer array pixels are converted into the YCrCb values has been described above, the configuration is not limited thereto. For example, when the minimum array unit is not a 2×2 pixel unit, the color values within the array unit may be converted into the YCrCb values. Although an example in which the shift amount of the pixel shift is p/2 has been described above, the configuration is not limited thereto. For example, the shift amount may be p/m (m is a natural number equal to or larger than 2).

The configuration of the imaging device is not limited to the configuration illustrated in FIG. 9. Various modifications may be made, such as omitting some of the elements, or adding an additional element. For example, the image conversion section 140, the super-resolution pixel value restoration estimation section 160, and the luminance/color difference value-RGB value conversion section 170 may be implemented by an image processing device (e.g., PC). In this case, the image processing device acquires shift images captured and recorded by the imaging device provided separately from the image processing device, and generates a high-resolution image.

According to the above embodiment, the imaging device includes the image sensor 120, the imaging control section 130, the image conversion section 140, the estimation calculation section (super-resolution pixel value restoration estimation section 160), and the pixel value conversion section (luminance/color difference value-RGB value conversion section 170) (see FIG. 9).

The image sensor 120 includes an array of pixels that respectively correspond to a plurality of colors. As described above with reference to FIG. 2, the imaging control section 130 performs a control process that acquires a captured image while sequentially shifting the position of the object image on the image sensor 120 by the shift amount p/2 that is smaller than the pixel pitch p of the image sensor 120. As described above with reference to FIG. 3 and the like, the image conversion section 140 calculates the luminance values $Y(a_{ij})$, the color difference values $Cr(a_{ij})$, and the color difference values $Cb(a_{ij})$ based on the pixel values $v_{ij}$ of the pixels within the acquired captured image that respectively correspond to the plurality of colors, and outputs the luminance image formed by the calculated luminance values $Y(a_{ij})$, the color difference image formed by the calculated color difference values $Cr(a_{ij})$, and the color difference image formed by the color difference values $Cb(a_{ij})$.

As described above with reference to FIG. 8, the estimation calculation section calculates the estimated luminance value $Y(v'_{ij})$ of each pixel of the high-resolution image having a resolution higher than the resolution obtained by the pixel pitch p of the image sensor 120 based on the luminance image, and calculates the estimated color difference value $Cr(v'_{ij})$ and the estimated color difference value $Cb(v'_{ij})$ of each pixel of the high-resolution image based on the color difference images. The pixel value conversion section converts the estimated luminance value $Y(v'_{ij})$, the estimated color difference value $Cr(v'_{ij})$, and the estimated color difference value $Cb(v'_{ij})$ into the RGB pixel values $R(v'_{ij})$, $G(v'_{ij})$, and $B(v'_{ij})$ of each pixel of the high-resolution image.

This makes it possible to improve the color estimation accuracy of the high-resolution process. Specifically, since the estimated luminance value $Y(v'_{ij})$, the estimated color difference value $Cr(v'_{ij})$, and the estimated color difference value $Cb(v'_{ij})$ of each pixel of the high-resolution image can be calculated (see FIG. 8), the RGB values of each pixel of the high-resolution image can be estimated. This makes it possible to improve the image quality by preventing a situation in which the image quality deteriorates due to interpolation from the estimated values, for example.

The expression "resolution higher than the resolution obtained by the pixel pitch p" used herein means that the pixel count is larger than the original pixel count within an identical imaging range (i.e., the entirety or part of the captured image). For example, when performing the high-resolution process on a digital zoom image, the pixel count within the zoom area increases due to the high-resolution process.

A basic block that forms the array of pixels of the image sensor 120 may include pixels that respectively correspond to first to kth colors (k is a natural number equal to or larger than 2) as the plurality of colors. As described above with reference to FIG. 3 and the like, the image conversion section 140 may set the conversion unit that includes the pixel values of the first to kth colors based on the captured image, and convert the pixel values included in the conversion unit into the luminance value $Y(a_{ij})$, the color difference value $Cr(a_{ij})$, and the color difference value $Cb(a_{ij})$. As described above with reference to FIG. 7A and the like, the estimation calculation section may calculate the estimated luminance value $Y(v'_{ij})$ based on a plurality of the luminance images obtained by the shift, and calculate the estimated color difference value $Cr(v'_{ij})$ and the estimated color difference value $Cb(v'_{ij})$ based on a plurality of the color difference images obtained by the shift.

It is possible to convert the captured image into the luminance image and the color difference images by thus converting the pixel values of the first to kth colors included in each conversion unit into the luminance value and the color difference values. Moreover, a plurality of sequentially shifted luminance images and a plurality of sequentially shifted color difference images are calculated from a plurality of sequentially shifted captured images, and the resolution of the luminance images and the color difference images can be increased using these images.

The term "basic block" used herein refers to a minimum constituent unit (repeating unit) of the array of pixels. The term "conversion unit" used herein refers to a combination of pixel values converted into the YCrCb values. The pixel values based on the captured image may be the pixel values of the captured image, or may be pixel values calculated from the pixel values of the captured image by interpolation or the like.

The array of pixels may be a Bayer array that includes 2×2 pixels including an R pixel, two G pixels, and a B pixel (k=4) as the basic block (see FIG. 2). As described above with reference to FIG. 3 and the like, the image conversion section 140 may set the conversion unit $a_{00}$ to include 2×2 pixels (e.g., $v_{00}$, $v_{20}$, $v_{02}$, and $v_{22}$) of the captured image, and convert the RGB pixel values $R(a_{00})$, $Gr(a_{00})$, $Gb(a_{00})$, and $B(a_{00})$ of the conversion unit $a_{00}$ into the luminance value $Y(a_{00})$, the color difference value $Cr(a_{00})$, and the color difference value $Cb(a_{00})$.

More specifically, the image conversion section 140 may set a plurality of conversion units $a_{ij}$, the positions (i, j) of the 2×2 pixels of the plurality of conversion units $a_{ij}$ being sequentially shifted by one pixel in the horizontal direction or the vertical direction (see FIG. 3).

This makes it possible to set the conversion unit using the pixel values of a Bayer image, and convert the RGB Bayer image into a YCrCb image. Since a YCrCb image having the same pixel count as that of the captured image can be obtained by setting a plurality of conversion units that are shifted by one pixel, the YCrCb values of each pixel of the high-resolution image can be estimated.

When the pixel pitch is p, and the shift amount in the horizontal direction and the vertical direction is p/m (m is a natural number equal to or larger than 2) (see FIG. 2), the imaging control section 130 may implement first to nth shifts (n is a natural number equal to or larger than 2) that make a round trip. As described above with reference to FIG. 8 and the like, the estimation calculation section may receive first to nth luminance images $Y(a_{ij})$ or first to nth color difference images $Cr(a_{ij})$ (or $Cb(a_{ij})$) corresponding to the first to nth shifts as first to nth input images, and calculate the estimated luminance values $Y(v'_{ij})$ or the estimated color difference values $Cr(v'_{ij})$ (or $Cb(v'_{ij})$) as the estimated pixel values based on the first to nth input images. As illustrated in FIGS. 3 to 6, the pixels of the first to nth input images are pixels that correspond to m×m pixels of the high-resolution image, and are pixels (e.g., $Y(a_{00})$, $Y(a_{10})$, $Y(a_{11})$, and $Y(a_{01})$) that are sequentially shifted in the position (i, j) on the high-resolution image corresponding to the shift by the shift amount p/m.

More specifically, as described above with reference to FIG. 2, the imaging control section 130 may implement the first shift (frame fx) that corresponds to a reference position, a second shift (frame fx+1) from the reference position by the shift amount p/2 in the horizontal direction, a third shift (frame fx+2) from the reference position by the shift amount p/2 in the horizontal direction and the vertical direction, and a fourth shift (frame fx+3) from the reference position by the shift amount p/2 in the vertical direction (m=2, n=4). The estimation calculation section may calculate the estimated pixel value corresponding to a pixel count 2×2 times that of the captured image from the first to fourth input images that respectively correspond to the first to fourth shifts.

This makes it possible to implement an increase in resolution using the images obtained by the round-trip shift. It is also possible to increase the pixel count by m×m corresponding to the shift amount p/m.

Note that the estimated pixel values may be estimated from only the first to nth input images (first estimation method), or may be estimated from the first to nth input images and an additional image (e.g., an interpolation image calculated from an input image) (third estimation method (described later)).

4. Second Estimation Method

A second estimation method that calculates the RGB values of each pixel of a Bayer image by interpolation, and converts the RGB values into YCrCb values on a pixel basis is described below.

Figure 10:
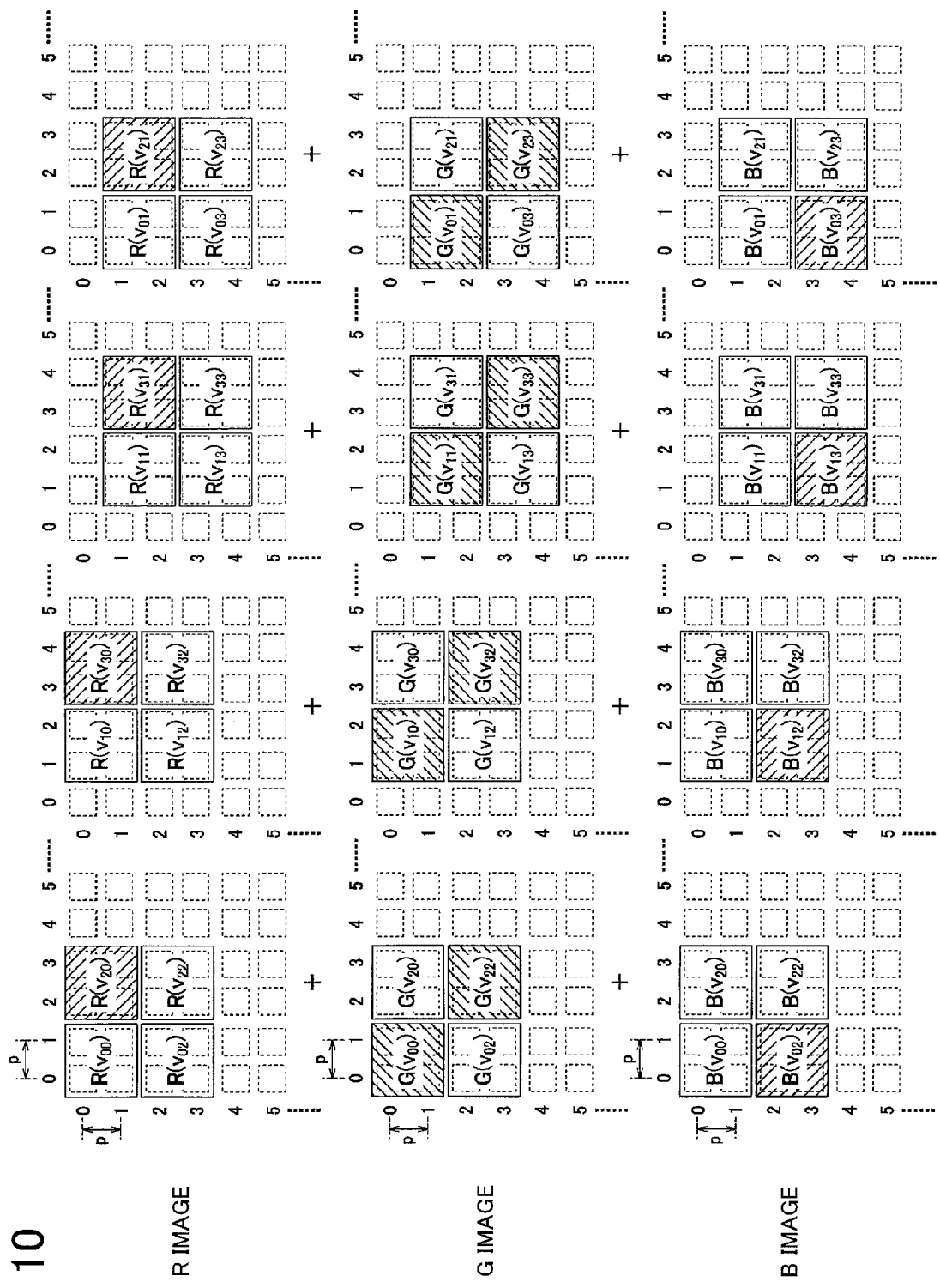
FIG. 10 is a view illustrating a YCrCb conversion method according to the second estimation method.

As illustrated in FIG. 10, undetected pixel values of each of four Bayer color images obtained by the ½ pixel shift are calculated by Bayer interpolation to generate complete R, G, and B images. The RGB values $\{R(v_{ij}), G(v_{ij}), B(v_{ij})\}$ of an identical pixel $v_{ij}$ of the generated R, G, and B images are converted into the YCrCb values $\{Y(v_{ij}), Cr(v_{ij}), Cb(v_{ij})\}$ of the pixel $v_{ij}$ (see the following expression (3)).

$$Y(v_{ij})=\alpha_y \cdot R(v_{ij})+\beta_y \cdot G(v_{ij})+\gamma_y \cdot B(v_{ij})$$

$$Cr(v_{ij})=\alpha_r \cdot R(v_{ij})+\beta_r \cdot G(v_{ij})+\gamma_r \cdot B(v_{ij})$$

$$Cb(v_{ij})=\alpha_b \cdot R(v_{ij})+\beta_b \cdot G(v_{ij})+\gamma_b \cdot B(v_{ij}) \tag{3}$$

Figure 11:
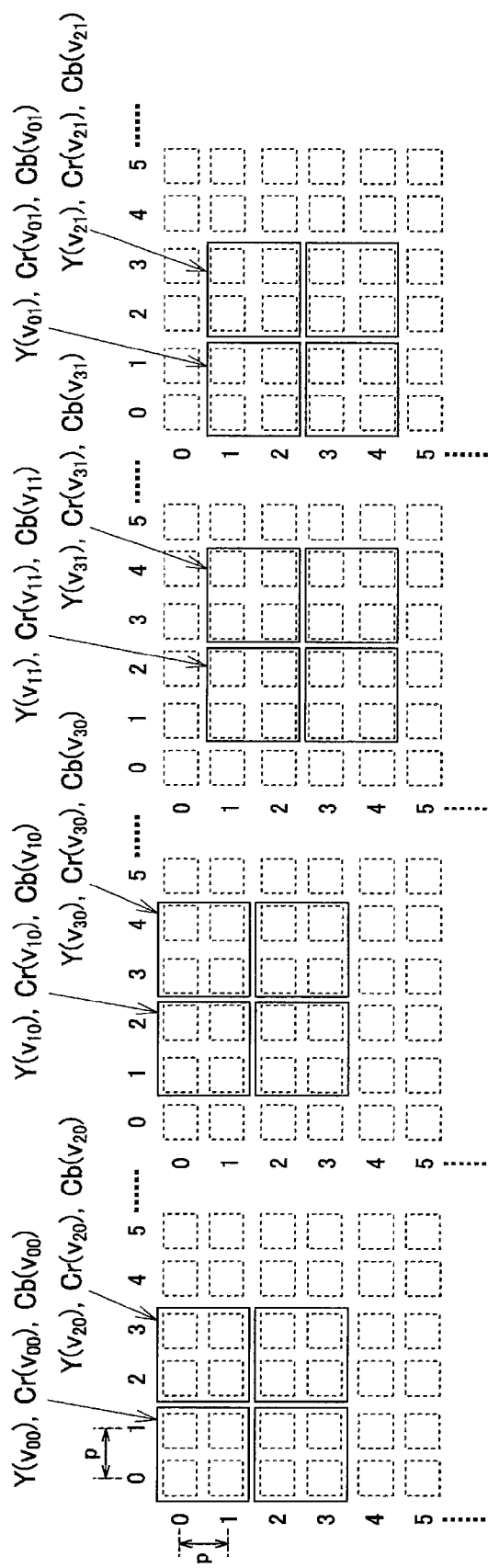
FIG. 11 is a view illustrating a YCrCb conversion method according to the second estimation method.

As illustrated in FIG. 11, four images in which the luminance value $Y(v_{ij})$ of each pixel $v_{ij}$ is shifted by ½ pixel in the horizontal direction or the vertical direction are obtained. Likewise, four images in which the color difference value $Cr(v_{ij})$ or $Cb(v_{ij})$ of each pixel $v_{ij}$ is shifted by ½ pixel in the horizontal direction or the vertical direction are obtained.

Figure 12:
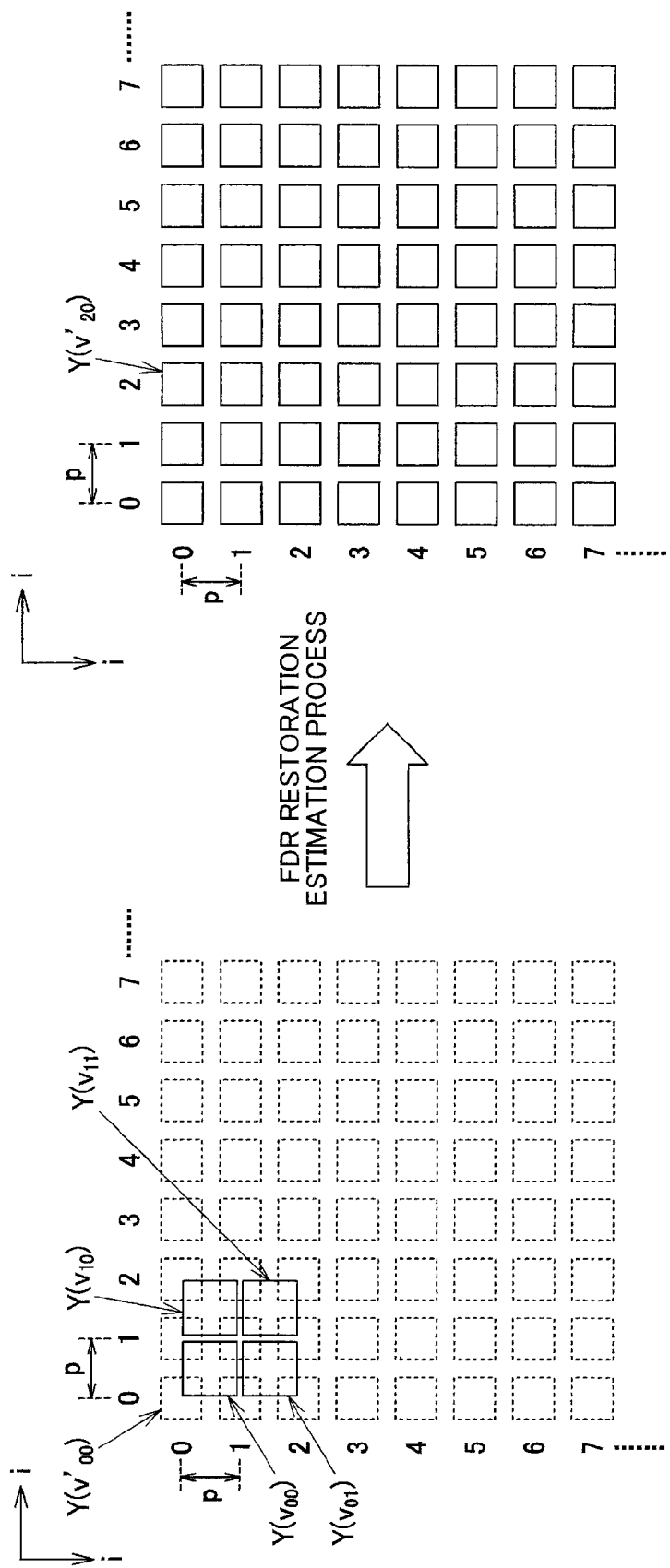
FIG. 12 is a view illustrating an estimation process that increases the resolution of YCrCb values.

As illustrated in FIG. 12, the luminance values $Y(v_{ij})$ are considered to be the overlap-shift 4-pixel addition values of the virtual super-resolution pixels $v'_{ij}$ ({$a_{ij}$} in FIG. 19A), and the estimation process is performed. The pixel values $Y(v'_{ij})$ (estimated values) are calculated by the estimation process as the luminance values corresponding to a pixel size half of that of the original pixels $v_{ij}$. The color difference values $Cr(v'_{ij})$ and the color difference values $Cb(v'_{ij})$ of the super-resolution pixels $v'_{ij}$ are also calculated by applying the above method to the color difference values.

The YCrCb values $\{Y(v'_{ij}), Cr(v'_{ij}), Cb(v'_{ij})\}$ of the virtual super-resolution pixels $v'_{ij}$ thus calculated are inversely converted using the expression (2) to calculate the RGB values of each pixel $v'_{ij}$ of the virtual super-resolution image to obtain a high-resolution image.

According to the above embodiment, the image conversion section 140 may calculate the RGB pixel values $R(v_{ij})$, $G(v_{ij})$, and $B(v_{ij})$ of each pixel $v_{ij}$ of the captured image by interpolation, and set the RGB pixel values of each pixel vi to be the conversion unit, as described above with reference to FIG. 10. As described above with reference to FIG. 11, the image conversion section 140 may convert the RGB pixel values set to be the conversion unit into the luminance value $Y(v_{ij})$, the color difference value $Cr(v_{ij})$, and the color difference value $Cb(v_{ij})$.

This makes it possible to set the conversion unit on a pixel basis using the RGB pixel values of the Bayer image calculated by interpolation, and convert the RGB Bayer image into a YCrCb image. For example, an R high-resolution image is estimated from the R image in which the R pixel values are calculated by Bayer interpolation. For example, when the pixel $v_{00}$ in FIG. 1 is an interpolated pixel, the pixels $v_{10}$, $v_{01}$, and $v_{11}$ obtained by the pixel shift are also interpolated pixels. In this case, since the estimated pixel $v'_{00}$ and the like are estimated from only the interpolated pixels, the estimation accuracy deteriorates. According to the above embodiment, however, since the conversion unit (e.g., $v_{00}$) includes at least one detected value ($G(v_{00})$) (i.e., a pixel value that is not an interpolated value), and the RGB values including the detected value are converted into the YCrCb values, the estimation accuracy can be improved as compared with the above case.

5. Modification of Second Estimation Method

The second estimation method that calculates the RGB values of each pixel of a Bayer image by interpolation, and converts the RGB values into YCrCb values on a four pixel basis is described below.

Figure 13:
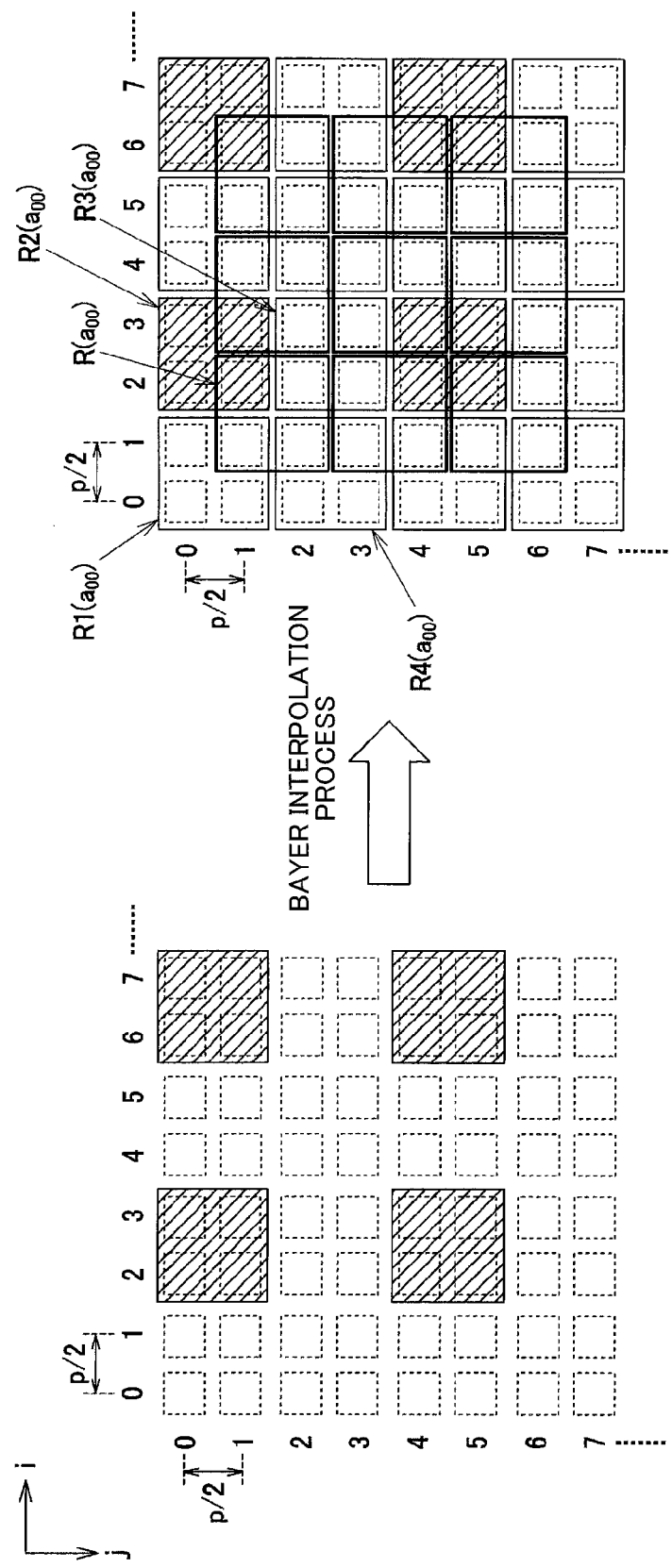
FIG. 13 is a view illustrating a YCrCb conversion method according to a modification of the second estimation method.

As illustrated in FIG. 13, the R pixel values (interpolated values) are calculated by Bayer interpolation. In FIG. 13, the detected pixels (e.g., $R2(a_{00})$) are indicated by a hatched solid square, and the interpolated pixels (e.g., $R1(a_{00})$) are indicated by a solid square without hatching. A 4-pixel addition value $R(a_{11})$ is calculated from the pixel values $\{R1(a_{ij}), R2(a_{ij}), R3(a_{ij}), R4(a_{ij})\}$ of four adjacent pixels (see the following expression (4)).

$$R(a_{ij})=R1(a_{ij})+R2(a_{ij})+R3(a_{ij})+R4(a_{ij})$$

$$G(a_{ij})=G1(a_{ij})+G2(a_{ij})+G3(a_{ij})+G4(a_{ij})$$

$$B(a_{ij})=B1(a_{ij})+B2(a_{ij})+B3(a_{ij})+B4(a_{ij}) \tag{4}$$

Figure 14:
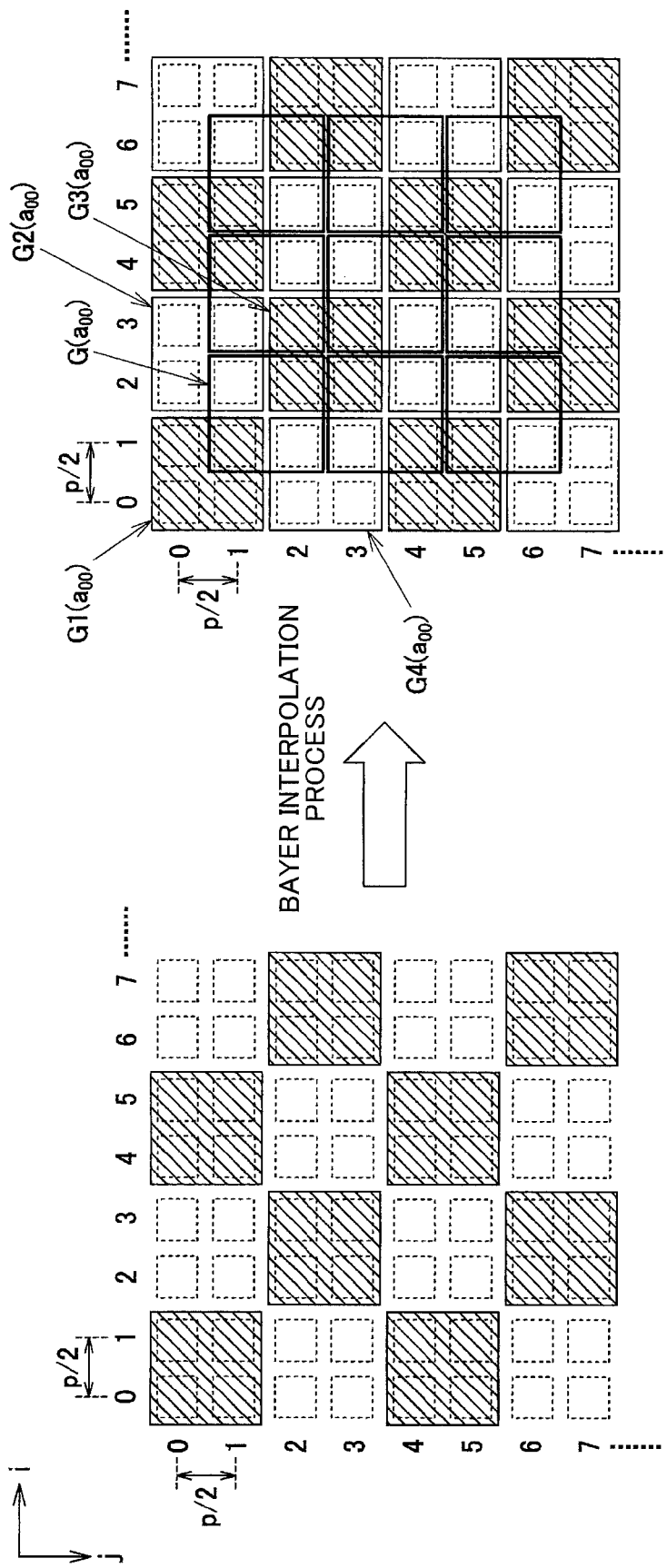
FIG. 14 is a view illustrating a YCrCb conversion method according to a modification of the second estimation method.
Figure 15:
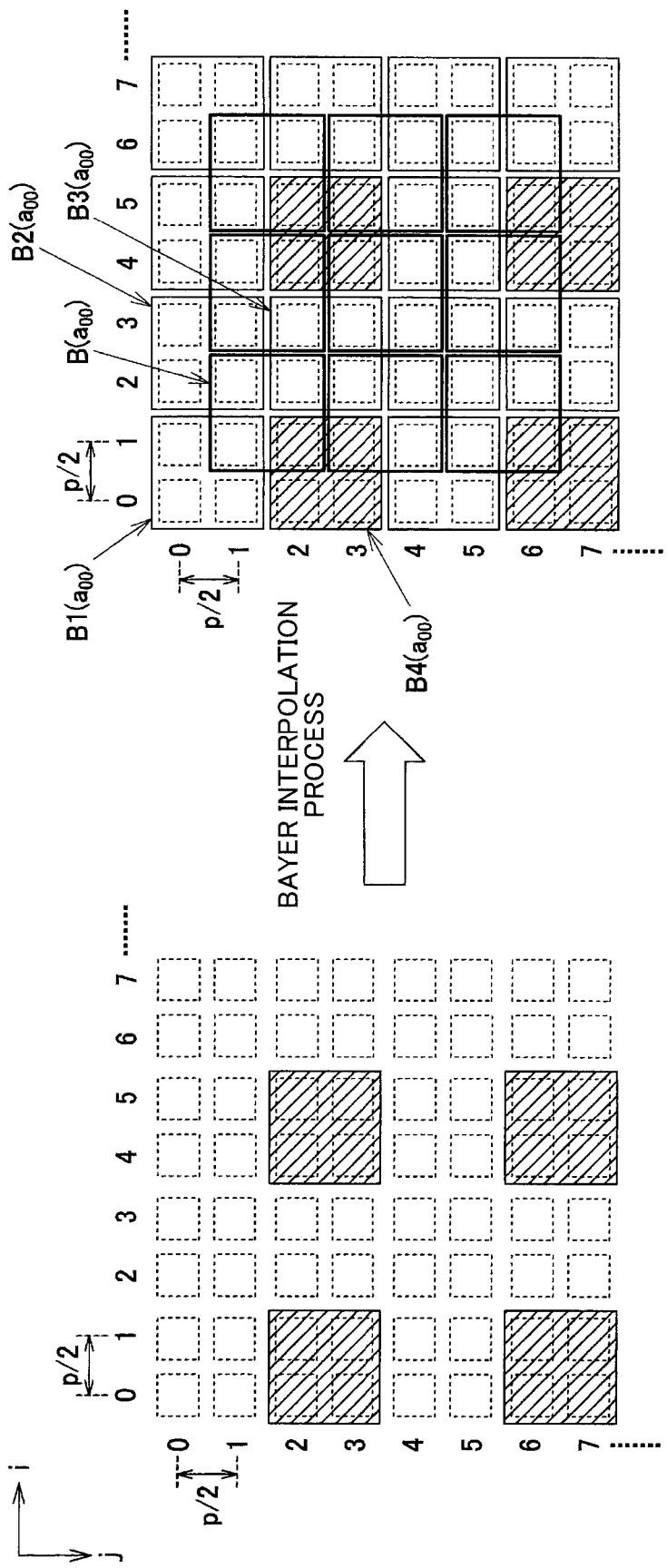
FIG. 15 is a view illustrating a YCrCb conversion method according to a modification of the second estimation method.

As illustrated in FIG. 14, the G pixel values are calculated by Bayer interpolation to obtain the pixel values $\{G1(a_{ij}), G2(a_{ij}), G3(a_{ij}), G4(a_{ij})\}$. As illustrated in FIG. 15, the B pixel values are calculated by Bayer interpolation to obtain the pixel values $\{B1(a_{ij}), B2(a_{ij}), B3(a_{ij}), B4(a_{ij})\}$. The 4-pixel addition values $\{G(a_{ij}), B(a_{ij})\}$ are calculated from these values (see the expression (4)).

The RGB components $\{R(a_{ij}), G(a_{ij}), B(a_{ij})\}$ of the 4-pixel addition values at an identical position (i, j) are converted into the YCrCb components $\{Y(v_{ij}), Cr(v_{ij}), Cb(v_{ij})\}$ of the 4-pixel addition value $a_{ij}$ (see the following expression (5)).

$$Y(a_{ij})=\alpha_y \cdot R(a_{ij})+\beta_y \cdot G(a_{ij})+\gamma_y \cdot B(a_{ij})$$

$$Cr(a_{ij})=\alpha_r \cdot R(a_{ij})+\beta_r \cdot G(a_{ij})+\gamma_r \cdot B(a_{ij})$$

$$Cb(a_{ij})=\alpha_b \cdot R(a_{ij})+\beta_b \cdot G(a_{ij})+\gamma_b \cdot B(a_{ij}) \tag{5}$$

The pixel values $\{R(a_{ij}), G(a_{ij}), B(a_{ij})\}$ of each of four Bayer color images obtained by the ½ pixel overlap shift, and the YCrCb values $\{Y(v_{ij}), Cr(v_{ij}), Cb(v_{ij})\}$ are calculated in the same manner as described above. The RGB values of the super-resolution pixels $v'_{ij}$ are calculated by the method described above with reference to FIG. 12.

According to the above embodiment, the image conversion section 140 may calculate the RGB pixel values $R1(a_{ij})$ to $R4(a_{ij})$, $G1(a_{ij})$ to $G4(a_{ij})$, and $B1(a_{ij})$ to $B4(a_{ij})$ of each pixel $v_{ij}$ of the captured image by interpolation, and set the conversion unit that includes four pixels of the captured image, as described above with reference to FIG. 13 and the like. The image conversion section 140 may calculate the addition value $R(a_{ij})$ of the four R pixel values of the conversion unit, the addition value $G(a_{ij})$ of the four G pixel values of the conversion unit, and the addition value $B(a_{ij})$ of the four B pixel values of the conversion unit, and convert the addition values of the RGB pixel values into the luminance value $Y(v_{ij})$, the color difference value $Cr(v_{ij})$, and the color difference value $Cb(v_{ij})$.

More specifically, the image conversion section 140 may set a plurality of conversion units $a_{ij}$, the positions (i, j) of the 2×2 pixels of the plurality of conversion units $a_{ij}$ being sequentially shifted by one pixel in the horizontal direction or the vertical direction.

This makes it possible to set the conversion unit using the 4-pixel addition values of the RGB pixel values of the Bayer image calculated by interpolation, and convert the RGB Bayer image into a YCrCb image. Since each of the RGB addition values includes the detected value (i.e., a pixel value that is not an interpolated value), the information about the detected value is included in the RGB values of the conversion unit. Therefore, the high-resolution image estimation accuracy can be improved.

6. Third Estimation Method

Although the above embodiments have been described taking an example in which four ½ pixel shifts that make a round trip are performed in the horizontal direction or the vertical direction, two ½ pixel shifts that make a round trip may be performed in the diagonal direction.

Figure 16:
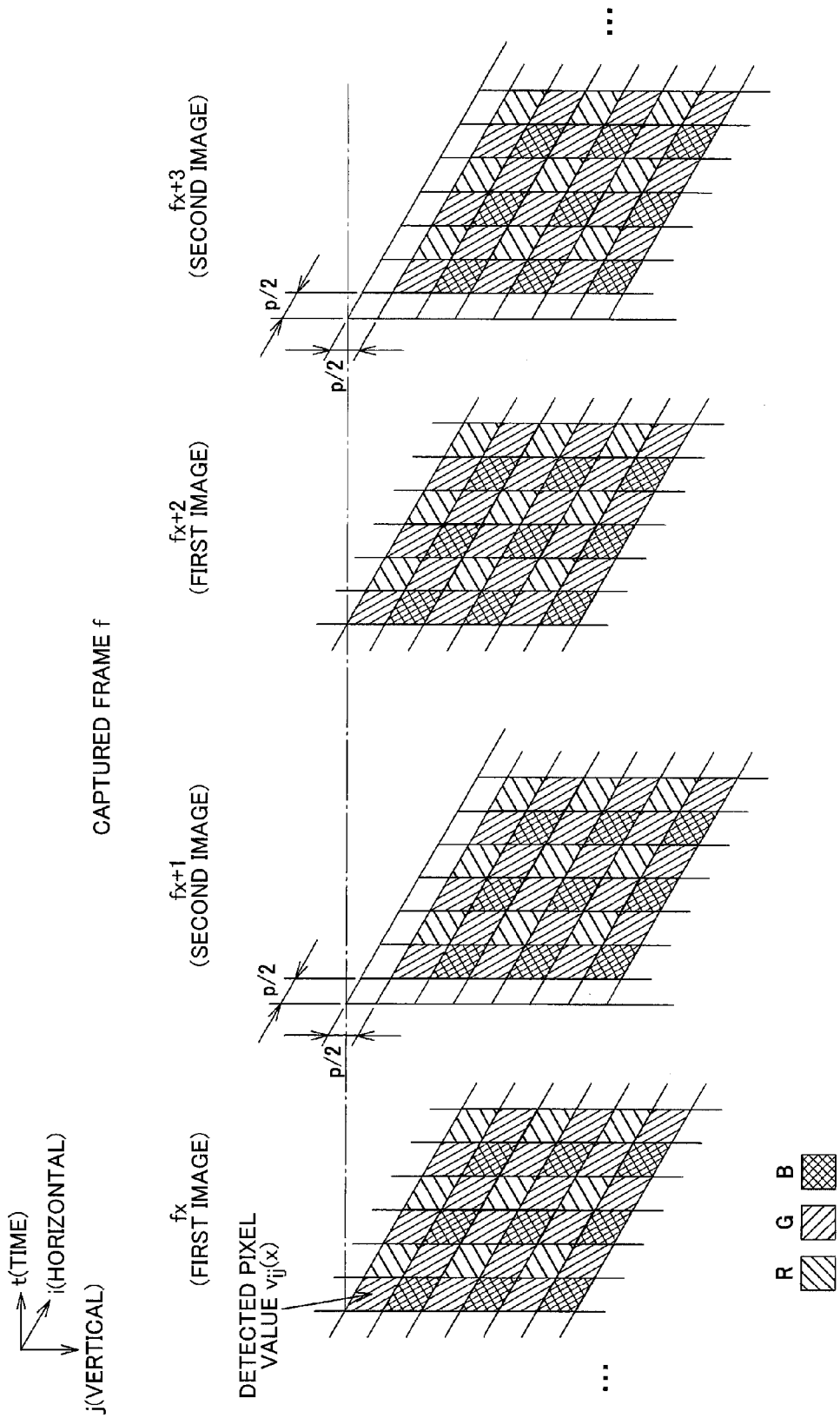
FIG. 16 is a view illustrating a pixel shift according to the third estimation method.

A third estimation method that implements the ½ pixel shift in the diagonal direction is described below. As illustrated in FIG. 16, a ½ pixel diagonal shift is performed every frame. Specifically, the image at the reference position is acquired in the first frame fx as a first image. The image at a position shifted from the reference position by a ½ pixel in the horizontal direction and the vertical direction is acquired in the second frame fx+1 as a second image. The first image and the second image are then alternately generated on a frame basis.

Figure 17:
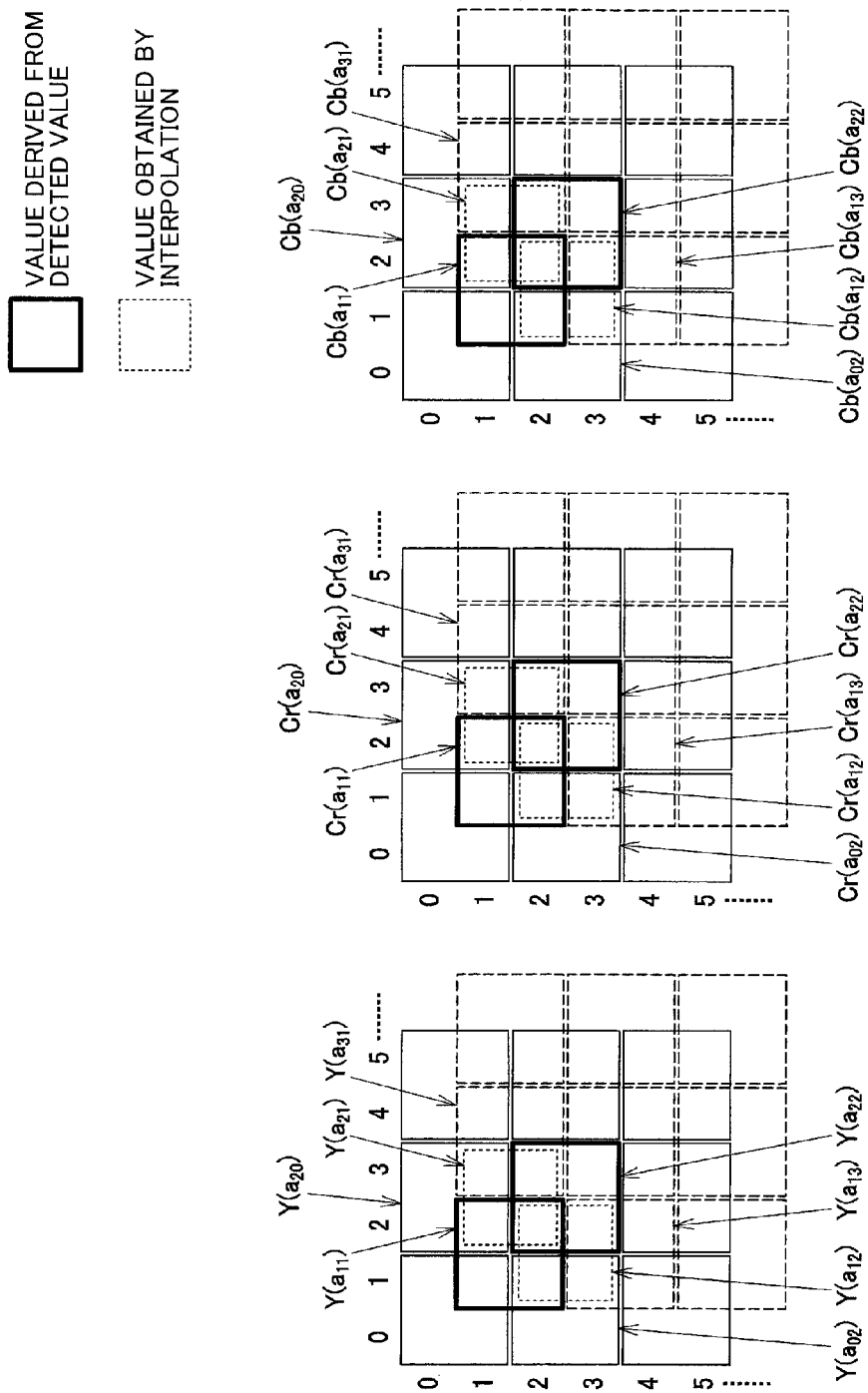
FIG. 17 is a view illustrating a YCrCb conversion method according to the third estimation method.

As illustrated in FIG. 17, the RGB values of each of the first image and the second image are converted into the YCrCb values. The RGB values may be converted into the YCrCb values using the above method. For example, the first luminance value $Y(a_{22})$ and the second luminance value $Y(a_{11})$ of the luminance image are luminance values respectively derived from the detected value of the first image and the detected value of the second image. The luminance values $Y(a_{21})$ and $Y(a_{12})$ are undetected luminance values that are not derived directly from the detected value.

The undetected luminance values $Y(a_{21})$ and $Y(a_{12})$ are calculated by an interpolation process based on the luminance values positioned around the undetected luminance values $Y(a_{21})$ and $Y(a_{12})$ (see the following expression (6)). Note that $\{w_1, w_2, w_3, w_4\}$ are interpolation coefficients. The interpolation coefficients are set in advance so that the interpolation accuracy becomes a maximum. A known method (e.g., bilinear interpolation or bicubic interpolation) may be used as the interpolation method, or an optimum interpolation coefficient may be appropriately set. The detected values used for interpolation are not limited to the four adjacent detected values. The detected values positioned around the undetected luminance values may be used in various patterns.

$$Y(a_{21}) = w_1 \cdot Y(a_{11}) + w_2 \cdot Y(a_{20}) + w_3 \cdot Y(a_{31}) + w_4 \cdot Y(a_{22})$$

$$Y(a_{12}) = w_1 \cdot Y(a_{02}) + w_2 \cdot Y(a_{11}) + w_3 \cdot Y(a_{22}) + w_4 \cdot Y(a_{13})$$

The undetected color difference values (Cr and Cb) are similarly calculated by interpolation from the color difference values positioned around the undetected color difference values.

Four luminance images that are subjected to the ½ pixel overlap shift in the horizontal direction or the vertical direction are thus obtained. The luminance values $Y(v'_{ij})$ of the super-resolution pixels $v'_{ij}$ are estimated from the four luminance images in the same manner as described above in connection with the first estimation method. The color difference values $Cr(v'_{ij})$ and the color difference values $Cb(v'_{ij})$ are also estimated in the same manner as the luminance values $Y(v'_{ij})$. The resulting YCrCb values are converted into the RGB values to calculate the RGB pixel values $R(v'_{ij})$, $G(v'_{ij})$, and $B(v'_{ij})$ of each pixel $v'_{ij}$ of the high-resolution image.

Figure 18:
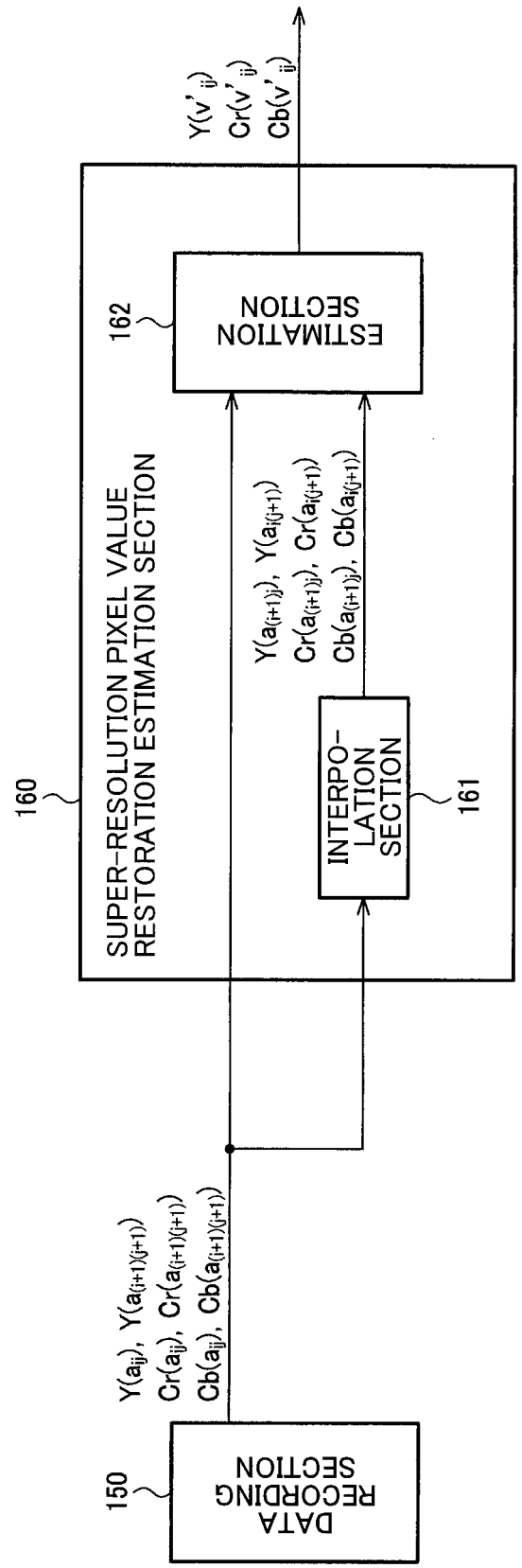
FIG. 18 illustrates a detailed configuration example of a super-resolution pixel value restoration estimation section.

FIG. 18 illustrates a detailed configuration example of the super-resolution pixel value restoration estimation section 160 when implementing the third estimation method. The super-resolution pixel value restoration estimation section 160 includes an interpolation section 161 and an estimation section 162.

The imaging control section 130 performs a control process that implements a shift in the diagonal direction, and acquires the first image and the second image. The image conversion section 140 converts the first image and the second image into the luminance values and the color difference values. The data recording section 150 records the luminance values and the color difference values. The interpolation section 161 performs the interpolation process based on the recorded luminance values and color difference values to calculate the undetected luminance values and the undetected color difference values. The estimation section 162 performs the high-resolution estimation process based on the luminance values and the color difference values output from the data recording section 150, and the undetected luminance values and the undetected color difference values output from the interpolation section 161.

According to the above embodiment, as described above with reference to FIG. 16, the imaging control section 130 may implement the first shift (frame fx) that corresponds to the reference position, and the second shift (frame fx+11) from the reference position by the shift amount p/2 in the horizontal direction and the vertical direction (m=2, n=2). As illustrated in FIG. 17, the estimation calculation section may calculate a first interpolated image (e.g., $Y(a_{12})$) corresponding to the shift from the reference position in the horizontal direction by the shift amount p/2, and a second interpolated image ($Y(a_{21})$) corresponding to the shift from the reference position in the vertical direction by the shift amount p/2 based on the first input image and the second input image ($Y(a_{22})$, $Y(a_{11})$). The estimation calculation section may calculate the estimated pixel value corresponding to a pixel count 2×2 times that of the captured image from the first input image, the second input image, the first interpolated image, and the second interpolated image.

This makes it possible to calculate the images necessary for the high-resolution process by interpolation from the images obtained by the round-trip shift, and implement an increase in resolution using the images. Since the shift count (two shifts) can be reduced as compared with the case where interpolation is not performed (four shifts) (see FIG. 2), the high-resolution image can be obtained from the images obtained within a shorter period, and a shake of a moving object or the like can be reduced.

7. High-Resolution Estimation Process

The estimation process that increases the resolution of the YCrCb values is described in detail below. The following description is given taking pixel values $\{a_{00}, a_{10}, a_{11}, a_{01}\}$ (i and j are integers equal to or larger than 0) as an example. Note that the following description is similarly applied to other pixel values.

Each pixel value $a_{ij}$ illustrated in FIG. 19A corresponds to the luminance value $Y(a_{ij})$, the color difference value $Cr(a_{ij})$, or the color difference value $Cb(a_{ij})$ described above with reference to FIGS. 3 to 6 and the like. Alternatively, each pixel value $a_{ij}$ corresponds to the luminance value $Y(v_{ij})$, the color difference value $Cr(v_{ij})$, or the color difference value $Cb(v_{ij})$ described above with reference to FIG. 11 and the like. Each pixel value $v'_{ij}$ corresponds to the luminance value $Y(v'_{ij})$, the color difference value $Cr(v'_{ij})$, or the color difference value $Cb(v'_{ij})$ described above with reference to FIG. 8 and the like.

Figure 19B:
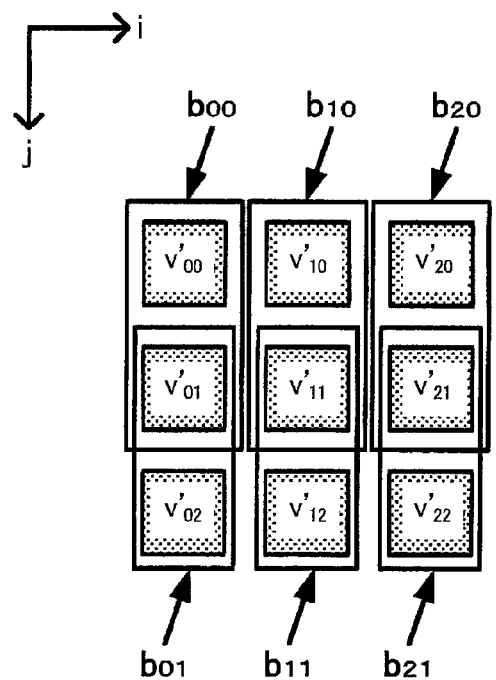

As illustrated in FIG. 19B, intermediate pixel values $b_{00}$ to $b_{21}$ (intermediate estimated pixel values) are estimated from the addition pixel values $a_{00}$ to $a_{11}$, and the final pixel values $v'_{00}$ to $v'_{22}$ are estimated from the intermediate pixel values $b_{00}$ to $b_{21}$.

An intermediate pixel value estimation process is described below taking the intermediate pixel values $b_{00}$ to $b_{20}$ in the first row (horizontal direction) as an example. The intermediate pixel values $b_{00}$ to $b_{20}$ are estimated based on the addition pixel values $a_{00}$ and $a_{10}$ in the first row (horizontal direction). The pixel values $a_{00}$ and $a_{10}$ are calculated by the following expression (7).

$$a_{00} = v'_{00} + v'_{01} + v'_{10} + v'_{11},$$

$$a_{10} = v'_{10} + v'_{11} + v'_{20} + v'_{21} \qquad (7)$$

The intermediate pixel values $b_{00}$, $b_{10}$, and $b_{20}$ are defined by the following expression (8).

$$b_{00}=v'_{00}+v'_{01},$$
$$b_{10}=v'_{10}+v'_{11},$$
$$b_{20}=v'_{20}+v'_{21} \quad (8)$$

Transforming the expression (7) using the expression (8) yields the following expression (9).

$$a_{00}=b_{00}+b_{10},$$
$$a_{10}=b_{10}+b_{20} \quad (9)$$

The following expression (10) is obtained by solving the expression (9) for the intermediate pixel values $b_{10}$ and $b_{20}$. Specifically, the intermediate pixel values $b_{10}$ and $b_{20}$ are expressed as a function where the intermediate pixel value $b_{00}$ is an unknown (initial variable).

$$b_{00}=(\text{unknown}),$$
$$b_{10}=a_{00}-b_{00},$$
$$b_{20}=b_{00}+\delta i_0=b_{00}+(a_{10}-a_{00}) \quad (10)$$

The pixel value pattern $\{a_{00}, a_{10}\}$ is compared with the intermediate pixel value pattern $\{b_{00}, b_{10}, b_{20}\}$, and the unknown $b_{00}$ at which the similarity becomes a maximum is determined. More specifically, an evaluation function Ej defined by the following expression (11) is calculated, and the unknown $b_{00}$ at which the evaluation function Ej becomes a minimum is derived. The resulting intermediate pixel value $b_{00}$ is substituted into the expression (10) to calculate the intermediate pixel values $b_{10}$ and $b_{20}$.

$$e_{ij} = \left(\frac{a_{ij}}{2} - b_{ij}\right)^2 + \left(\frac{a_{ij}}{2} - b_{(i+1)j}\right)^2,$$
$$E_j = \sum_{i=0}^{1} e_{ij} \quad (11)$$

The estimated pixel values $v'_{ij}$ are calculated as described below using the intermediate pixel values $b_{ij}$ in the first column (vertical direction). The estimated pixel values $v'_{ij}$ are calculated in the same manner as the intermediate pixel values $b_{ij}$. Specifically, the estimated pixel values $v'_{ij}$ are calculated in the same manner as the intermediate pixel values $b_{ij}$, except that the following expression (12) is used instead of the expression (9).

$$b_{00}=v'_{00}+v'_{01},$$
$$b_{01}=v'_{01}+v'_{02} \quad (12)$$

According to the above embodiment, a range that includes a plurality of pixels (e.g., 2×2 pixels) of the high-resolution image is set to be the addition unit $a_{ij}$, and the pixel values that correspond to the first addition unit and the second addition unit (e.g., $a_{00}$ and $a_{10}$) are set to be the first pixel value and the second pixel value (e.g., $Y(a_{00})$ and $Y(a_{10})$) (see FIG. 13A). The first addition unit $a_{00}$ and the second addition unit $a_{10}$ overlap each other (i.e., include the common pixels $v'_{10}$ and $v'_{11}$). The luminance image or the color difference image is input to the estimation calculation section as an input image. The first pixel value and the second pixel value are pixel values obtained by the pixel values of the input image, or obtained by interpolation based on the input image. The estimation calculation section calculates the difference value $\delta i_0 = a_{10} - a_{00}$ between the first pixel value $a_{00}$ and the second pixel value $a_{10}$, and calculates the estimated luminance value or the estimated color difference value as the estimated pixel value $v'_{ij}$ based on the difference value.

As illustrated in FIG. 13B, the first intermediate pixel value $b_{00}$ is the addition pixel value of the first area ($v'_{00}$, $v'_{01}$) obtained by removing the overlapping area ($v'_{10}$, $v'_{11}$) from the addition unit $a_{00}$. The second intermediate pixel value $b_{20}$ is the addition pixel value of the second area ($v'_{20}$, $v'_{21}$) obtained by removing the overlapping area ($v'_{10}$, $v'_{11}$) from the addition unit $a_{10}$. The estimation calculation section generates a relational expression of the first intermediate pixel value $b_{00}$ and the second intermediate pixel value $b_{20}$ using the difference value $\delta i_0$ (see the expression (10)), and estimates the first intermediate pixel value $b_{00}$ and the second intermediate pixel value $b_{20}$ using the relational expression. The estimation calculation section calculates the pixel value $v'_{ij}$ of each pixel included in the addition unit using the estimated first intermediate pixel value $b_{00}$.

According to the above configuration, the high-resolution image estimation process can be simplified by estimating the intermediate pixel values from the pixel values of the addition unit obtained using the overlap shift, and calculating the estimated pixel values from the intermediate pixel values. For example, a complex process (e.g., repeated calculations using a two-dimensional filter (see JP-A-2009-115074) or a process that searches an area appropriate for setting the initial value (see JP-A-2009-124621)) can be made unnecessary.

The intermediate pixel value pattern ($b_{00}$, $b_{10}$, $b_{20}$) may include consecutive intermediate pixel values that include the first intermediate pixel value and the second intermediate pixel value (e.g., $b_{00}$ and $b_{20}$). The estimation calculation section may generate the relational expression of the intermediate pixel values included in the intermediate pixel value pattern using the first pixel value $a_{00}$ and the second pixel value $a_{10}$ (see the expression (10)). The estimation calculation section may compare the intermediate pixel value pattern expressed by the relational expression of the intermediate pixel values with the first pixel value $a_{00}$ and the second pixel value $a_{10}$ to evaluate the similarity. The estimation calculation section may determine the intermediate pixel values $b_{00}$, $b_{10}$, $b_{20}$ included in the intermediate pixel value pattern based on the similarity evaluation result so that the similarity becomes a maximum.

This makes it possible to estimate the intermediate pixel values based on the addition pixel values acquired by the pixel shift performed so that the addition units overlap each other.

Note that the intermediate pixel value pattern is a data string (data set) of the intermediate pixel values within a range used for the estimation process. The addition pixel value pattern is a data string of the addition pixel values within a range used for the estimation process.

The estimation calculation section may calculate the evaluation function Ej that indicates an error between the intermediate pixel value pattern ($\{b_{00}, b_{10}, b_{20}\}$) expressed by the relational expression of the intermediate pixel values and the addition pixel value s ($a_{00}$, $a_{10}$) (see the expression (11)). The estimation calculation section may determine the intermediate pixel values $b_{00}$, $b_{10}$, $b_{20}$ included in the intermediate pixel value pattern so that the value of the evaluation function Ej becomes a minimum.

The intermediate pixel values can be estimated by thus expressing the error using the evaluation function, and calculating the intermediate pixel value that corresponds to the minimum value of the evaluation function. For example, the initial value used for the intermediate pixel value estimation process can be set using a simple process by calculating the unknown using the least-square method. Specifically, it is unnecessary to search an image area appropriate for setting the initial value (see JP-A-2009-124621).

8. Second High-Resolution Estimation Process

A second high-resolution estimation process that increases the resolution of the YCrCb values is described in detail below. Note that illustration of the pixel pitch p is omitted for convenience.

Figure 20B:
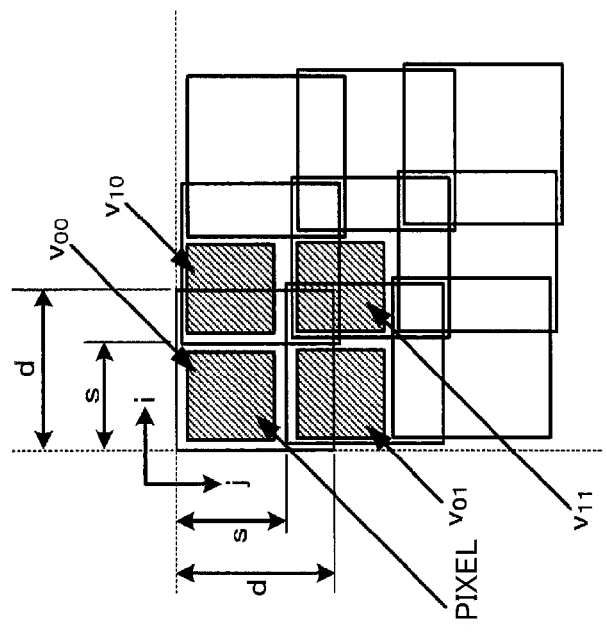
FIGS. 20A and 20B are views illustrating a pixel shift according to the second high-resolution estimation process.
Figure 20A:
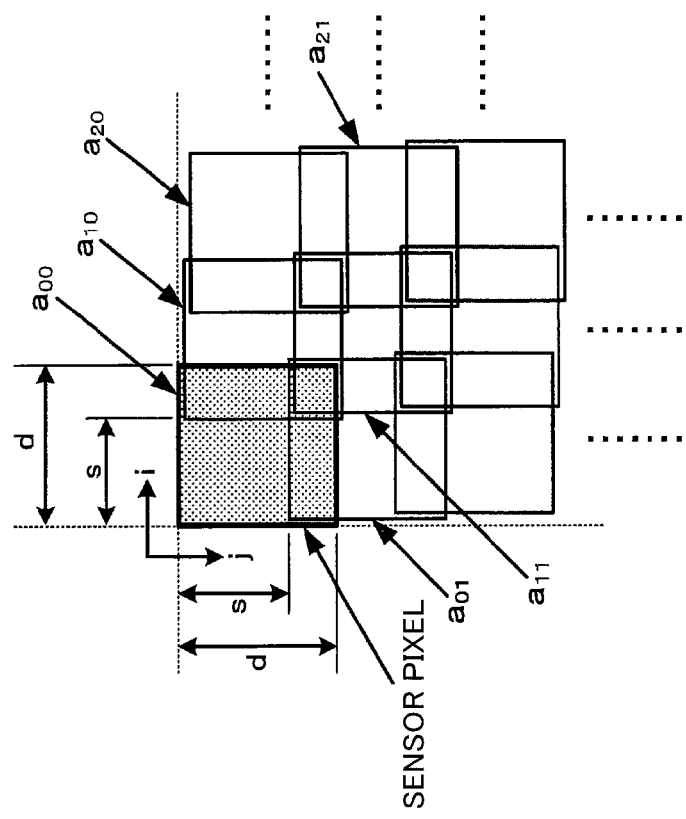

As illustrated in FIG. 20A, the light-receiving plane (sensor pixels) of the image sensor and the object image formed in the light-receiving plane are relatively shifted by the shift amount s that is smaller than the width d of the aperture of the pixel of the image sensor. The shift is performed by mechanically shifting the image sensor or the imaging lens as described above with reference to FIG. 2. For example, when the shift amount s is 2p/3, nine images are captured while implementing 3×3 shifts in the horizontal direction and the vertical direction by the shift amount s. The estimated pixel values $v_{ij}$ illustrated in FIG. 20B are estimated based on the 2×2 pixel values (e.g., $a_{00}, a_{10}, a_{01},$ and $a_{11}$) of the nine images that are shifted by the shift amount s (e.g., the estimated pixel value $v_{00}$ is estimated from the pixel values $a_{00}, a_{10}, a_{01},$ and $a_{11}$).

As illustrated in FIG. 20B, the estimation process is performed while implementing a shift by the shift amount s to sequentially calculate the pixel values $v_{ij}$ of the high-resolution image. For example, the pixel value $v_{10}$ that is shifted from the pixel value $v_{00}$ in the horizontal direction by the shift amount s (see FIG. 20B) is estimated using the pixel values $a_{10}, a_{20}, a_{11},$ and $a_{21}$ that are shifted from the pixel values $a_{00}, a_{10}, a_{01},$ and $a_{11}$ in the horizontal direction by the shift amount s (see FIG. 20A). A high-resolution image of which the pixel pitch s is smaller than the actual pixel pitch p is thus acquired. The pixel count of the high-resolution image is larger than that of the original captured image by a factor of $(p/s)^2$.

Note that the 2×2 pixel values used for estimation may not be the pixel values obtained from an identical pixel. FIG. 20A illustrates only the pixel values obtained by shifting one pixel of the image sensor nine times (3×3) for convenience. Note that the pixels are arranged at the pixel pitch p, and the 2×2 pixel values that are shifted by the shift amount s are selected from the pixel values obtained by shifting the pixels arranged at the pixel pitch p.

Figure 21:
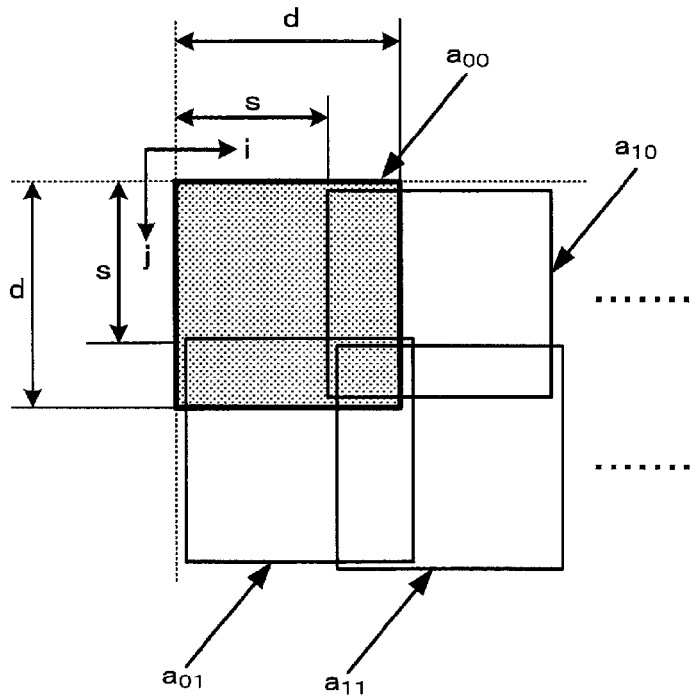
FIG. 21 is a view illustrating a pixel value used for the second high-resolution estimation process.

An example in which the estimated pixel value $v_{00}$ is estimated from the pixel values $a_{00}, a_{10}, a_{01},$ and $a_{11}$ (see FIG. 21) is described below. The following description is given taking an example in which the resolution is increased in the horizontal direction, and then increased in the vertical direction. Note that the resolution may be increased in the vertical direction, and then increased in the horizontal direction.

Figure 22:
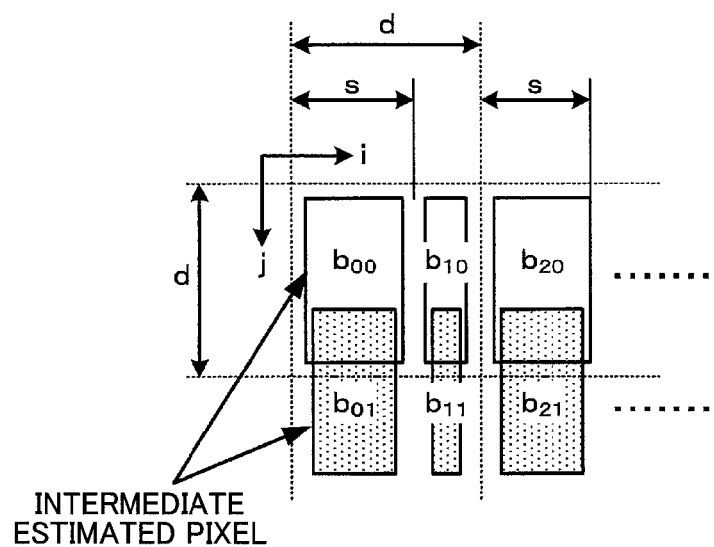
FIG. 22 is a view illustrating an intermediate pixel value used for the second high-resolution estimation process.

As illustrated in FIG. 22, intermediate pixel values $\{b_{00}, b_{10}, b_{20}\}$ are defined in the horizontal direction in the overlapping area and the non-overlapping area of the shifted pixels. The intermediate pixel value $b_{10}$ corresponds to the overlapping area of the pixel values $a_{00}$ and $a_{10}$, the intermediate pixel value $b_{00}$ corresponds to the non-overlapping area of the pixel value $a_{00}$, and the intermediate pixel value $b_{20}$ corresponds to the non-overlapping area of the pixel value $a_{10}$. Note that the term "overlapping area" refers to an area in which the apertures of the pixels of the image sensor overlap each other. Specifically, the term "overlapping area" refers to an area in which the apertures of the pixels shifted by the shift amount s overlap each other. The term "non-overlapping area" refers to an area in which the apertures of the pixels of the image sensor do not overlap each other. Specifically, the term "non-overlapping area" refers to an area in which the apertures of the pixels shifted by the shift amount s do not overlap each other.

The pixel values $\{a_{00}, a_{10}\}$ obtained by overlap-shift sampling in the horizontal direction by an arbitrary shift amount s are considered to be the addition values of adjacent pixel values among the intermediate pixel values $\{b_{00}, b_{10}, b_{20}\}$. The detected pixel values $\{a_{00}, a_{10}\}$ are defined by the following expression (13).

$$a_{00} = b_{00} + b_{10},$$

$$a_{10} = b_{10} + b_{20} \quad (13)$$

A relational expression of the intermediate pixel values $\{b_{00}, b_{10}, b_{20}\}$ can be derived as shown below where the intermediate pixel value $b_{00}$ is an unknown (dominant variable) (see the following expression (14)).

$$b_{00} = \text{(unknown)},$$

$$b_{10} = a_{00} - b_{00},$$

$$b_{20} = b_{00} + (a_{10} - a_{00}) \quad (14)$$

The intermediate pixel value $\{b_{00}, b_{10}, b_{20}\}$ may have a different relationship (combination pattern) (see the expression (14)). A method that calculates the combination pattern with the maximum likelihood using the detected pixel values $\{a_{00}, a_{10}\}$ is described below.

As illustrated in FIG. 22, the intermediate pixel values $\{b_{00}, b_{10}, b_{20}\}$ differ in the sampling aperture size with respect to the captured image. Specifically, the aperture width of the intermediate pixel values $b_{00}$ and $b_{20}$ in the horizontal direction is s, and the aperture width of the intermediate pixel value $b_{10}$ in the horizontal direction is d-s. For example, when the captured image is a natural image or the like, the frequency component is large at a low frequency, and decreases as the frequency increases. The frequency components of the captured image acquired when the sampling aperture size is large are characterized in that the low-frequency component is large, and the high-frequency component is small. The frequency components of the captured image acquired when the sampling aperture size is small are characterized in that the low-frequency component is relatively small, and the high-frequency component is relatively large. Therefore, it is considered that values that are weighted by the sampling aperture size are obtained as the intermediate pixel values $\{b_{00}, b_{10}, b_{20}\}$ with high probability on average (stochastically). Specifically, when the detected pixel values $\{a_{00}, a_{10}\}$ have been provided, the weighting coefficients $c_1$ and $c_2$ are calculated by the following expression (15) taking account of the aperture occupancy of the intermediate pixel value with respect to the pixel of the image sensor. Note that $0 < s < d$, $0 < c_1 < 1$, and $0 < c_2 < 1$.

$$c_1 = b_{00}/a_{00} = (s \times d)/d^2 (= b_{20}/a_{10}),$$

$$c_2 = b_{10}/a_{00} = [(d-s) \times d]/d^2 \quad (15)$$

The reference values (i.e., values expected with high probability) $\{b_{00}', b_{10}', b_{10}'', b_{20}''\}$ of the intermediate pixel values $\{b_{00}, b_{10}, b_{20}\}$ are given by the following expression (16) (see the expression (15)). Note that the weighting coefficients $c_1$ and $c_2$ may be considered to be the sensitivity ratio of the intermediate pixel values with respect to the detected pixel values. In this case, the weighting coefficients $c_1$ and $c_2$ may be calculated in advance taking account of the characteristics of the image sensor.

$$b_{00}'=c_1 \cdot a_{00},$$

$$b_{10}'=c_2 \cdot a_{00}, b_{10}''=c_2 \cdot a_{10},$$

$$b_{20}'=c_1 \cdot a_{10} \quad (16)$$

Figure 23:
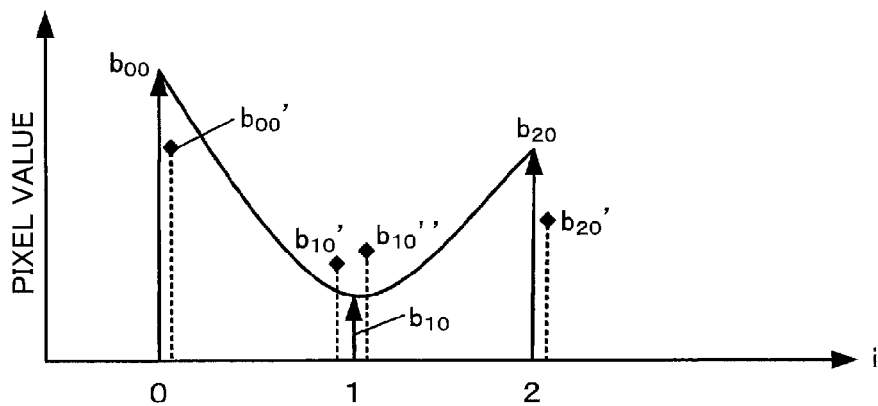
FIG. 23 is a view illustrating an intermediate pixel value calculation process used for the second high-resolution estimation process.

As illustrated in FIG. 23, the combination pattern of the intermediate pixel values $\{b_{00}, b_{10}, b_{20}\}$ (see the expression (14)) is compared with the reference values $\{b_{00}', b_{10}', b_{10}'', b_{20}'\}$ (see the expression (16)), and the intermediate pixel values $\{b_{00}, b_{10}, b_{20}\}$ that minimize an error are specified as the estimated values with reasonable likelihood. Specifically, an error evaluation function $e_b$ is calculated by substituting the expression (14) into the following expression (17), the unknown $b_{00}$ at which the value of the evaluation function $e_b$ becomes a minimum is determined, and the determined intermediate pixel value $b_{00}$ is substituted into the expression (14) to calculate the intermediate pixel values $\{b_{10}, b_{20}\}$.

$$e_b=(b_{00}-b_{00}')^2+(b_{10}-b_{10}')^2+(b_{10}-b_{10}'')^2+(b_{20}-b_{20}')^2 \quad (17)$$

Figure 24:
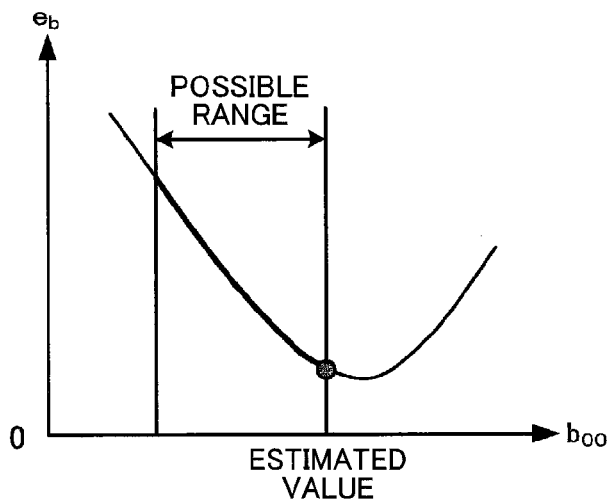
FIG. 24 is a view illustrating an intermediate pixel value calculation process used for the second high-resolution estimation process.

The possible ranges of the detected pixel values $\{a_{00}, a_{10}\}$ are determined in advance by the quantization bit rate (e.g., $0<a_{00}<N$, $0<a_{10}<N$). Note that N is a natural number that indicates the possible maximum value of the detected pixel value. Since the intermediate pixel values $\{b_{00}, b_{10}, b_{20}\}$ are 0 or a positive value, the possible ranges of the intermediate pixel values $\{b_{00}, b_{10}, b_{20}\}$ that satisfy the expression (14) are limited when the detected pixel values $\{a_{00}, a_{10}\}$ have been provided. As illustrated in FIG. 24, the intermediate pixel values $\{b_{00}, b_{10}, b_{20}\}$ within the possible ranges at which the value of the evaluation function $e_b$ (see the expression (17)) becomes a minimum are calculated.

Note that the evaluation function $e_b$ may be calculated by the following expression (18) to reduce the amount of calculations.

$$e_b=(b_{00}-b_{00}')^2+(b_{10}-b_{10}')^2+(b_{20}-b_{20}')^2 \quad (18)$$

Figure 25:
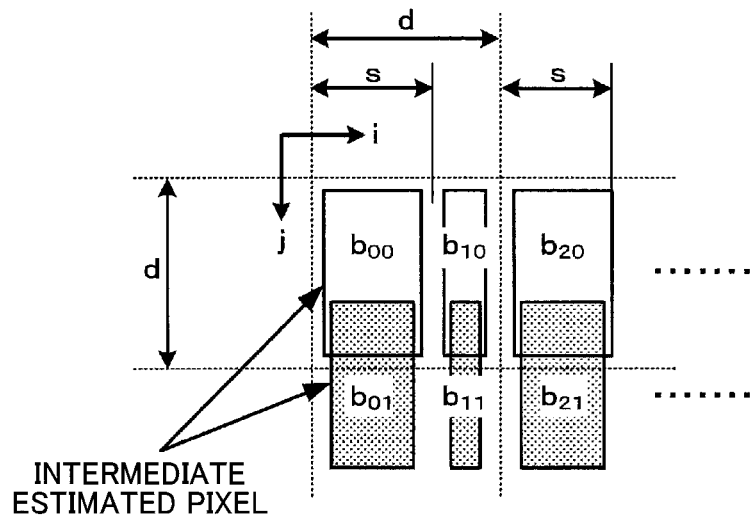
FIG. 25 is a view illustrating an intermediate pixel value used to calculate an estimated pixel value during the second high-resolution estimation process.

The above process is applied to the intermediate pixel values $\{b_{01}, b_{11}, b_{21}\}$ (see FIG. 25) to calculate the intermediate pixel value $\{b_{01}, b_{11}, b_{21}\}$ from the detected pixel values $\{a_{01}, a_{11}\}$.

Figure 26:
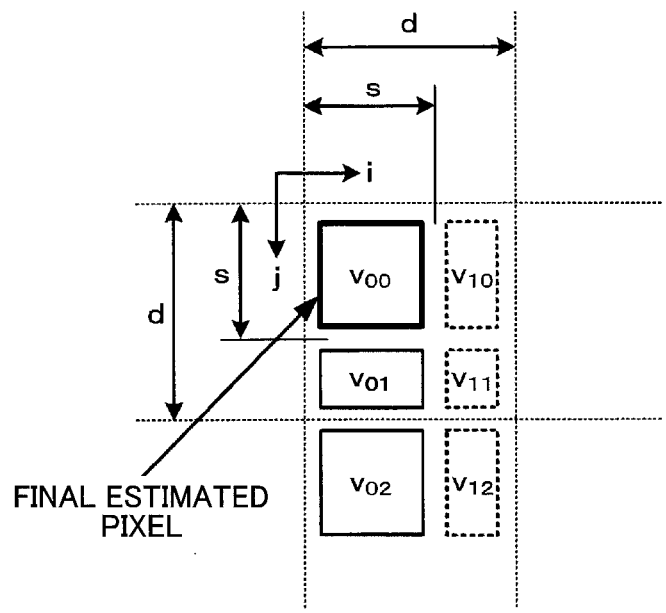
FIG. 26 is a view illustrating an estimated pixel value estimated by the second high-resolution estimation process.

A method that calculates the final estimated pixel values from the intermediate pixel values $\{b_{00}, b_{10}, b_{20}\}$ and $\{b_{01}, b_{11}, b_{21}\}$ is described below. As illustrated in FIG. 26, the final estimated pixel values are defined in the vertical direction in the overlapping area and the non-overlapping area of the intermediate pixels. A method that calculates the final estimated pixel values $\{v_{00}, v_{01}, v_{02}\}$ using the intermediate pixel values $\{b_{00}, b_{01}\}$ in the first column is described below as a representative example.

The intermediate pixel values $\{b_{00}, b_{01}\}$ are obtained by overlap-shift sampling in the vertical direction by an arbitrary shift amount s. Therefore, the intermediate pixel values $\{b_{00}, b_{01}\}$ are considered to be the addition values of adjacent pixel values among the final estimated pixel values $\{(v_{00}, v_{01}, v_{02})\}$ (see the following expression (19)).

$$b_{00}=v_{00}+v_{01},$$

$$b_{01}=v_{01}+v_{02} \quad (19)$$

A relational expression of the final estimated pixel values $\{v_{00}, v_{01}, v_{02}\}$ can be derived from the expression (19) as shown below where the final estimated pixel value $v_{00}$ is an unknown (dominant variable) (see the following expression (20)).

$$v_{00}=\text{unknown},$$

$$v_{01}=b_{00}-v_{00},$$

$$v_{02}=v_{00}+(b_{01}-b_{00}) \quad (20)$$

The intermediate pixel value $\{b_{00}, b_{10}, b_{20}\}$ may have a different relationship (combination pattern) (see the expression (20)). A method that calculates the combination pattern with the maximum likelihood using the detected pixel values $\{a_{00}, a_{10}\}$ is described below.

As illustrated in FIG. 26, the estimated pixel values $\{v_{00}, v_{01}, v_{02}\}$ differ in the sampling aperture size with respect to the captured image. Specifically, the aperture size of the estimated pixel values $v_{00}$ and $v_{02}$ is $s^2$, and the aperture size of the estimated pixel value $v_{01}$ is $s \times (d-s)$. It is considered that values that are weighted by the sampling aperture size are obtained as the estimated pixel values $\{v_{00}, v_{01}, v_{02}\}$ with high probability on average (stochastically) for the reasons described above with reference to FIG. 22 and the expression (15). Specifically, when the intermediate pixel values $\{b_{00}, b_{01}\}$ have been provided, the weighting coefficients $c_3$ and $c_4$ are calculated by the following expression (21) taking account of the aperture occupancy of the estimated pixel value with respect to the intermediate pixel value. Note that $0<s<d$, $0<c_3<1$, and $0<c_4<1$.

$$c_3=v_{00}/b_{00}=s^2/(s \times d)(=v_{02}/b_{01}),$$

$$c_4=v_{01}/b_{00}=[s \times (d-s)]/(s \times d) \quad (21)$$

The reference values (i.e., values expected with high probability) $\{v_{00}', v_{01}', v_{01}'', v_{02}'\}$ of the estimated pixel values $\{v_{00}, v_{01}, v_{02}\}$ are given by the following expression (22) (see the expression (21)). Note that the weighting coefficients $c_3$ and $c_4$ may be considered to be the sensitivity ratio of the estimated pixel values with respect to the intermediate pixel values. In this case, the weighting coefficients $c_3$ and $c_4$ may be calculated in advance taking account of the characteristics of the image sensor.

$$v_{00}'=c_3 \cdot b_{00},$$

$$v_{01}'=c_4 \cdot b_{00}, v_{01}''=c_4 \cdot b_{01},$$

$$v_{02}'=c_3 \cdot b_{01} \quad (22)$$

Figure 27:
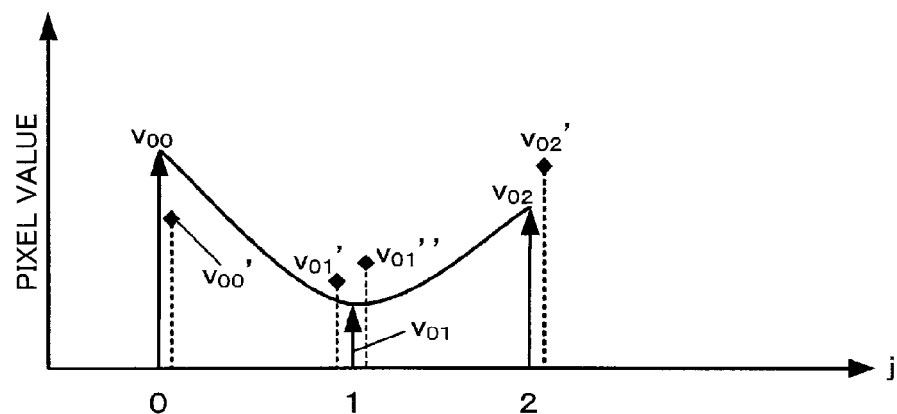
FIG. 27 is a view illustrating an estimated pixel value calculation process used for the second high-resolution estimation process.

As illustrated in FIG. 27, the combination pattern of the estimated pixel values $\{v_{00}, v_{01}, v_{02}\}$ (see the expression (20)) is compared with the reference values $\{v_{00}', v_{01}', v_{01}'', v_{02}'\}$ (see the expression (22)), and the estimated pixel values $\{v_{00}, v_{01}, v_{02}\}$ that minimize an error are specified as the estimated values with reasonable likelihood. Specifically, an error evaluation function $e_v$ is calculated by substituting the expression (20) into the following expression (23), the unknown $v_{00}$ at which the value of the evaluation function $e_v$ becomes a minimum is determined, and the determined estimated pixel value $v_{00}$ is substituted into the expression (20) to calculate the estimated pixel values $\{v_{01}, v_{02}\}$.

$$e_v=(v_{00}-v_{00}')^2+(v_{01}-v_{01}')^2+(v_{01}-v_{01}'')^2+(v_{02}-v_{02}')^2 \quad (23)$$

Figure 28:
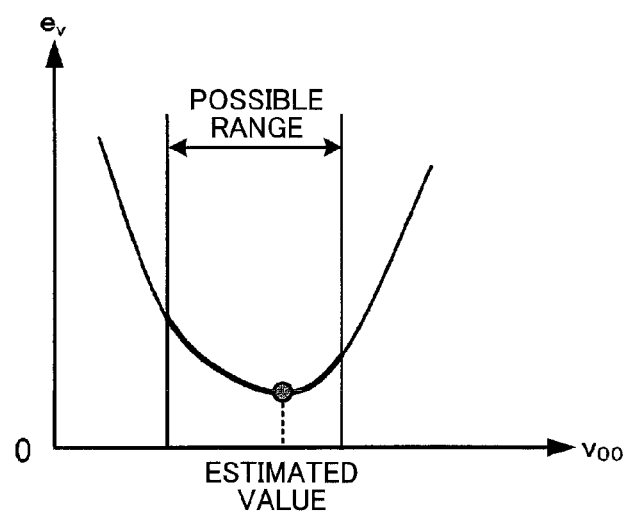
FIG. 28 is a view illustrating an estimated pixel value calculation process used for the second high-resolution estimation process.

Since the estimated pixel values $\{v_{00}, v_{01}, v_{02}\}$ are 0 or a positive value, the possible ranges of the estimated pixel values $\{v_{00}, v_{01}, v_{02}\}$ that satisfy the expression (20) are limited when the intermediate pixel values $\{b_{00}, b_{01}\}$ have been provided. As illustrated in FIG. 28, the estimated pixel values $\{v_{00}, v_{01}, v_{02}\}$ within the possible ranges at which the value of the evaluation function $e_v$ (see the expression (23)) becomes a minimum are calculated.

Note that the evaluation function $e_v$ may be calculated by the following expression (24) to reduce the amount of calculations.

$$e_v=(v_{00}-v_{00}')^2+(v_{01}-v_{01}')^2+(v_{02}-v_{02}')^2 \quad (24)$$

The final estimated pixel values $\{v_{00}, v_{01}, v_{02}\}$ are thus calculated at the same time. When it is desired to obtain the sampling values in which the aperture of the pixel s×s, and the pixel pitch in the horizontal direction and the vertical direction is s (see FIG. 20B), only the final estimated pixel value $\{v_{00}\}$ among the final estimated pixel values $\{v_{00}, v_{01}, v_{02}\}$ may be used. Specifically, the final estimated pixel values $\{v_{ij}\}$ (i and j are arbitrary pixel addresses) may be sequentially calculated one by one by performing the above estimation method while sequentially implementing a shift in the horizontal direction and the vertical direction.

9. Third High-Resolution Estimation Process

A third high-resolution estimation process that increases the resolution of the YCrCb values is described in detail below. Note that illustration of the pixel pitch p is omitted for convenience.

Figure 29:
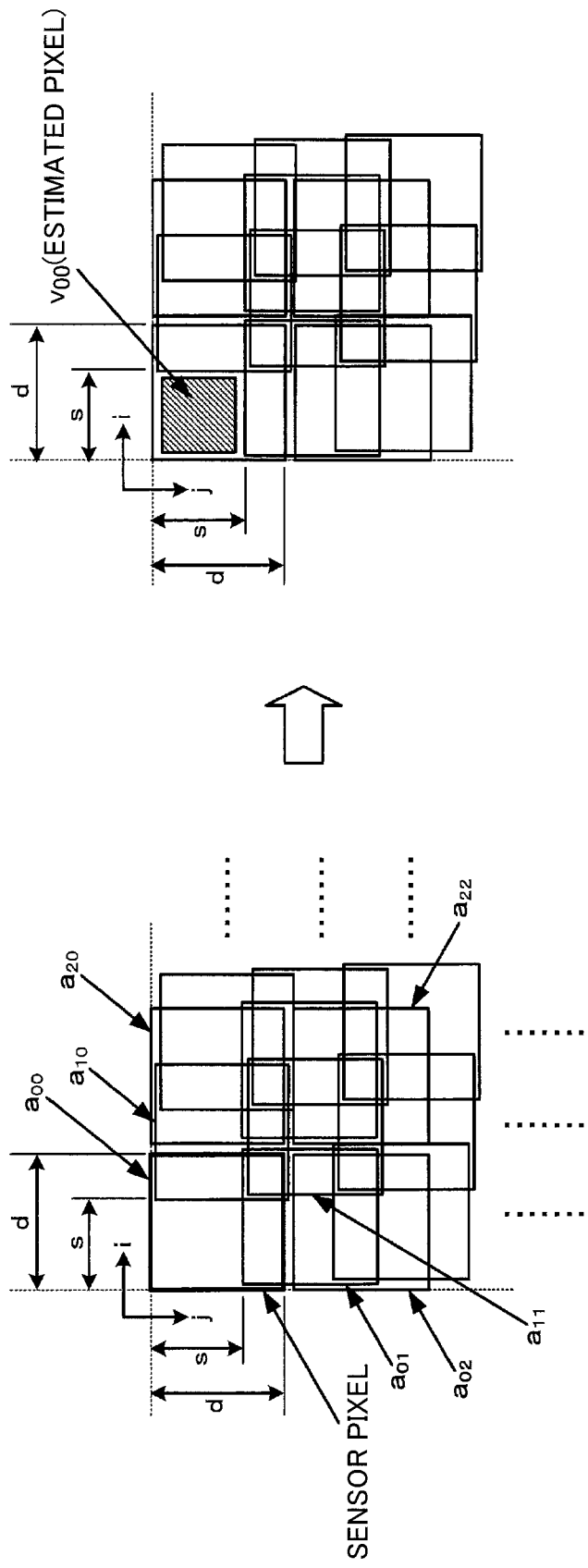
FIGS. 29A and 29B are views illustrating a pixel shift according to the third high-resolution estimation process.

As illustrated in FIG. 29A, the light-receiving plane (sensor pixels) of the image sensor and the object image formed in the light-receiving plane are relatively shifted by the shift amount s that is smaller than the width d of the aperture of the pixel of the image sensor. For example, when the shift amount s is 2p/3, nine images are captured while implementing 3×3 shifts in the horizontal direction and the vertical direction by the shift amount s. Note that FIG. 29A illustrates only the 2×2 pixels $(a_{00}, a_{20}, a_{02}, a_{22})$ that are arranged on the image sensor at the pitch p, and the pixel values (e.g., $a_{00}, a_{10}, a_{01}$, and $a_{11}$) obtained by shifting one pixel ($a_{00}$) among the 2×2 pixels ($a_{00}, a_{20}, a_{02}, a_{22}$) nine times (3×3) for convenience.

Figure 30:
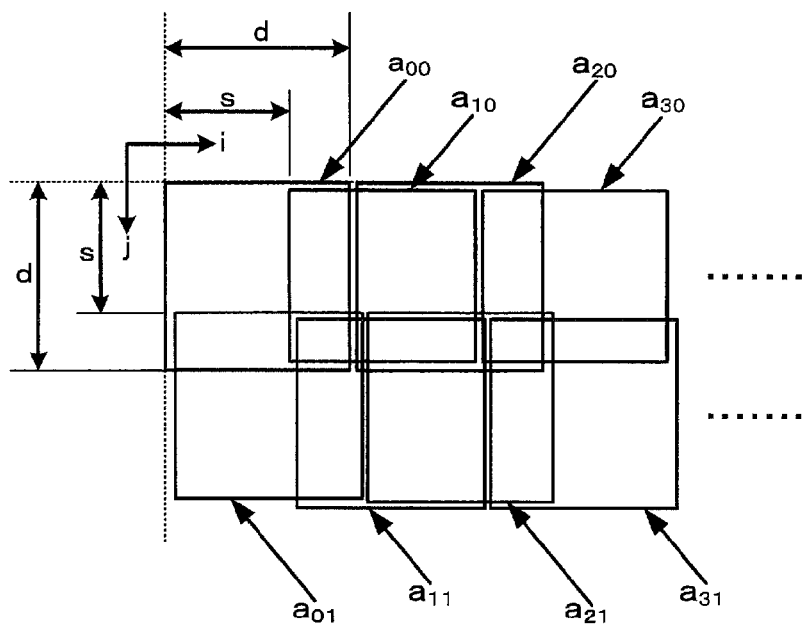
FIG. 30 is a view illustrating a pixel value used for the third high-resolution estimation process.

As illustrated in FIG. 29B, the pixel value $v_{00}$ of the high-resolution image is calculated from nine captured images. As illustrated in FIG. 30, the pixel value $v_{00}$ is calculated from eight pixel values $\{a_{00}, a_{10}, a_{20}, a_{30}, a_{01}, a_{11}, a_{21}, a_{31}\}$. The pixel values $a_{10}$ and $a_{30}$ are the pixel values of the pixels that are arranged on the image sensor in the horizontal direction at the pixel pitch p. The pixel values $a_{10}$ and $a_{30}$ are pixel values when the pixels respectively having the pixel values $a_{00}$ and $a_{20}$ are shifted in the horizontal direction by the shift amount s, the pixel values $a_{01}$ and $a_{11}$ are pixel values when the pixels respectively having the pixel values $a_{00}$ and $a_{20}$ are shifted in the vertical direction by the shift amount s, and the pixel values $a_{11}$ and $a_{31}$ are pixel values when the pixels respectively having the pixel values $a_{00}$ and $a_{20}$ are shifted in the horizontal direction and the vertical direction by the shift amount s.

The estimation process is performed while implementing a shift by the shift amount s to sequentially calculate the pixel values $v_{ij}$ of the high-resolution image. A high-resolution image of which the pixel pitch s is smaller than the actual pixel pitch p is thus acquired. The pixel count of the high-resolution image is larger than that of the original captured image by a factor of $(p/s)^2$.

An example in which the estimated pixel value $v_{00}$ is estimated from the pixel values $\{a_{00}, a_{10}, a_{20}, a_{30}, a_{01}, a_{11}, a_{21}, a_{31}\}$ illustrated in FIG. 30 is described below. The following description is given taking an example in which the resolution is increased in the horizontal direction, and then increased in the vertical direction. Note that the resolution may be increased in the vertical direction, and then increased in the horizontal direction.

Figure 31:
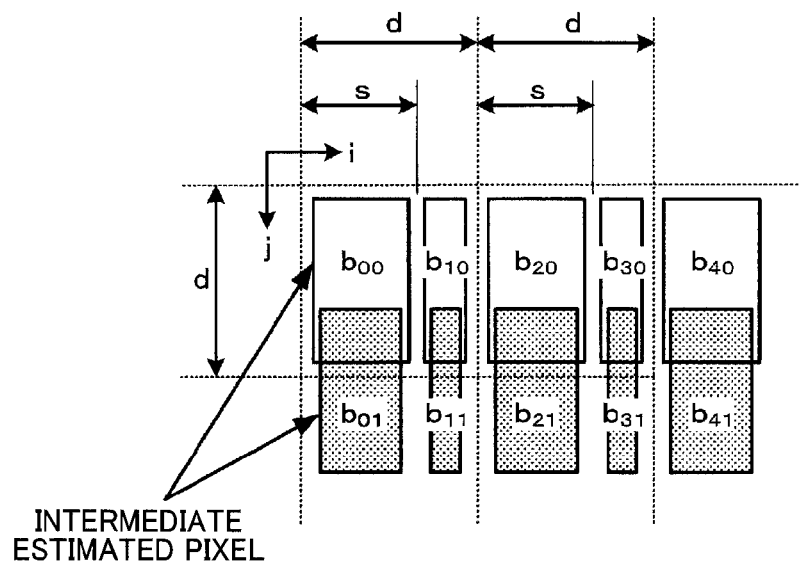
FIG. 31 is a view illustrating an intermediate pixel value used for the third high-resolution estimation process.

As illustrated in FIG. 31, intermediate pixel values $\{b_{00}, b_{10}, b_{20}, b_{30}, b_{40}\}$ are defined in the horizontal direction in the overlapping area and the non-overlapping area of the shifted pixels. The intermediate pixel value $b_{00}$ corresponds to the non-overlapping area of the pixel values $a_{00}$ and $a_{10}$, the intermediate pixel value $b_{10}$ corresponds to the overlapping area of the pixel values $a_{00}$ and $a_{10}$, the intermediate pixel value $b_{20}$ corresponds to the non-overlapping area of the pixel values $a_{00}$ and $a_{10}$ (or the pixel values $a_{20}$ and $a_{30}$), the intermediate pixel value $b_{30}$ corresponds to the overlapping area of the pixel values $a_{20}$ and $a_{30}$, and the intermediate pixel value $b_{40}$ corresponds to the non-overlapping area of the pixel values $a_{20}$ and $a_{30}$.

The pixel values $\{a_{00}, a_{10}, a_{20}, a_{30}\}$ obtained by overlap-shift sampling in the horizontal direction by an arbitrary shift amount s are considered to be the addition values of the intermediate pixel values $\{b_{00}, b_{10}, b_{20}, b_{30}, b_{40}\}$. The detected pixel values $\{a_{00}, a_{10}, a_{20}, a_{30}\}$ are defined by the following expression (25).

$$a_{00}=b_{00}+b_{10},$$

$$a_{10}=b_{10}+b_{20},$$

$$a_{20}=b_{20}+b_{30},$$

$$a_{30}=b_{30}+b_{40} \qquad (25)$$

A relational expression of the intermediate pixel values $\{b_{00}, b_{10}, b_{20}, b_{30}, b_{40}\}$ can be derived as shown below where the intermediate pixel value $b_{00}$ is an unknown (dominant variable) (see the following expression (26)).

$$b_{00}=\text{(unknown)},$$

$$b_{10}=a_{00}-b_{00},$$

$$b_{20}=b_{00}+(a_{10}-a_{00}),$$

$$b_{30}=a_{20}-b_{20},$$

$$b_{40}=a_{30}-b_{30} \qquad (26)$$

The intermediate pixel values $\{b_{00}, b_{10}, b_{20}, b_{30}, b_{40}\}$ may have a different relationship (combination pattern) (see the expression (26)). A method that calculates the combination pattern with the maximum likelihood using the detected pixel values $\{a_{00}, a_{10}, a_{20}, a_{30}\}$ is described below.

As illustrated in FIG. 31, the intermediate pixel values $\{b_{00}, b_{10}, b_{20}, b_{30}, b_{40}\}$ differ in the sampling aperture size with respect to the captured image. It is considered that values that are weighted by the sampling aperture size are obtained as the intermediate pixel values $\{b_{00}, b_{10}, b_{20}, b_{30}, b_{40}\}$ with high probability on average (stochastically) for the reasons described above with reference to FIG. 22 and the expression (15) (second high-resolution estimation process). Specifically, when the detected pixel values $\{a_{00}, a_{10}, a_{20}, a_{30}\}$ have been provided, the weighting coefficients $c_1$ and $c_2$ are calculated by the following expression (27) taking account of the aperture occupancy of the intermediate pixel value with respect to the pixel of the image sensor. Note that $0<s<d$, $0<c_1<1$, and $0<c_2<1$.

$$c_1=b_{00}/a_{00}=(s\times d)/d^2,$$

$$c_2=b_{10}/a_{00}=[(d-s)\times d]/d^2 \qquad (27)$$

The reference values (i.e., values expected with high probability) $\{b_{00}', b_{10}', b_{10}'', b_{20}', b_{20}'', b_{30}', b_{30}'', b_{40}'\}$ of the intermediate pixel values $\{b_{00}, b_{10}, b_{20}, b_{30}, b_{40}\}$ are given by the following expression (28) (see the expression (27)). Note that the weighting coefficients $c_1$ and $c_2$ may be considered to be the sensitivity ratio of the intermediate pixel values with respect to the detected pixel values. In this case, the weighting coefficients $c_1$ and $c_2$ may be calculated in advance taking account of the characteristics of the image sensor.

$$b_{00}'=c_1 \cdot a_{00},$$

$$b_{10}'=c_2 \cdot a_{00}, b_{01}''=c_2 \cdot a_{10},$$

$$b_{20}'=c_1 \cdot a_{10}, b_{20}''=c_1 \cdot a_{20},$$

$$b_{30}'=c_2 \cdot a_{20}, b_{30}''=c_2 \cdot a_{30},$$

$$b_{40}'=c_1 \cdot a_{30} \qquad (28)$$

Figure 32:
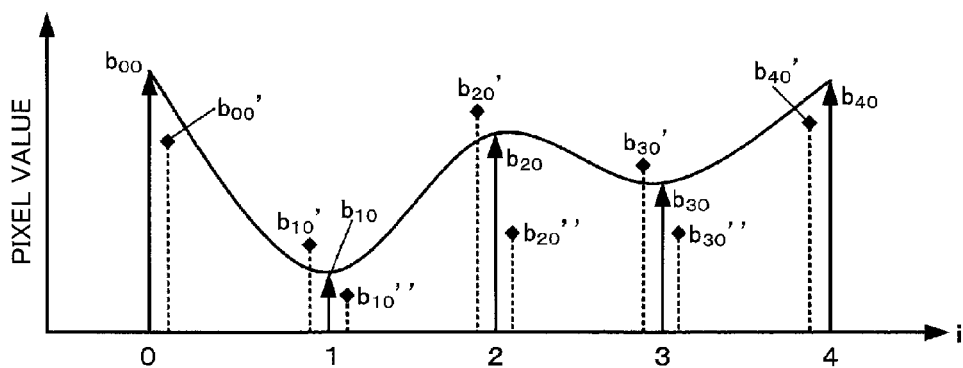
FIG. 32 is a view illustrating an intermediate pixel value calculation process used for the third high-resolution estimation process.

As illustrated in FIG. 32, the combination pattern of the intermediate pixel values $\{b_{00}, b_{10}, b_{20}, b_{30}, b_{40}\}$ (see the expression (26)) is compared with the reference values $\{b_{00}', b_{10}', b_{10}'', b_{20}', b_{20}'', b_{30}', b_{30}'', b_{40}'\}$ (see the expression (28)), and the intermediate pixel values $\{b_{00}, b_{10}, b_{20}, b_{30}, b_{40}\}$ that minimize an error are specified as the estimated values with reasonable likelihood. Specifically, an error evaluation function $e_b$ is calculated by substituting the expression (26) into the following expression (29), the unknown $b_{00}$ at which the value of the evaluation function $e_b$ becomes a minimum is determined, and the determined intermediate pixel value $b_{00}$ is substituted into the expression (26) to calculate the intermediate pixel values $\{b_{00}, b_{10}, b_{20}\}$.

$$e_b=(b_{00}-b_{00}')^2+(b_{10}-b_{10}')^2+(b_{10}-b_{10}'')^2+(b_{20}-b_{20}')^2+(b_{20}-b_{20}'')^2+(b_{30}-b_{30}')^2+(b_{30}-b_{30}'')^2+(b_{40}-b_{40}')^2 \qquad (29)$$

Figure 33:
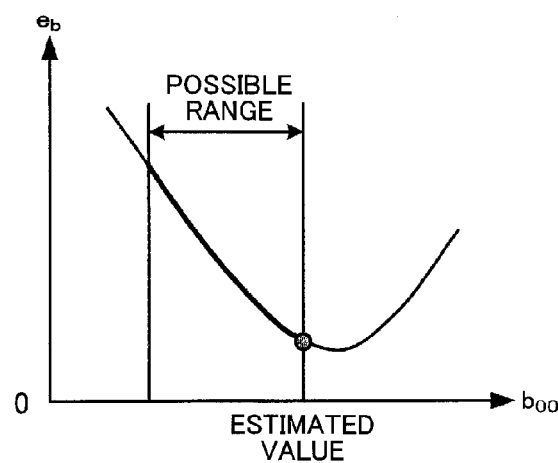
FIG. 33 is a view illustrating an intermediate pixel value calculation process used for the third high-resolution estimation process.
Figure 34:
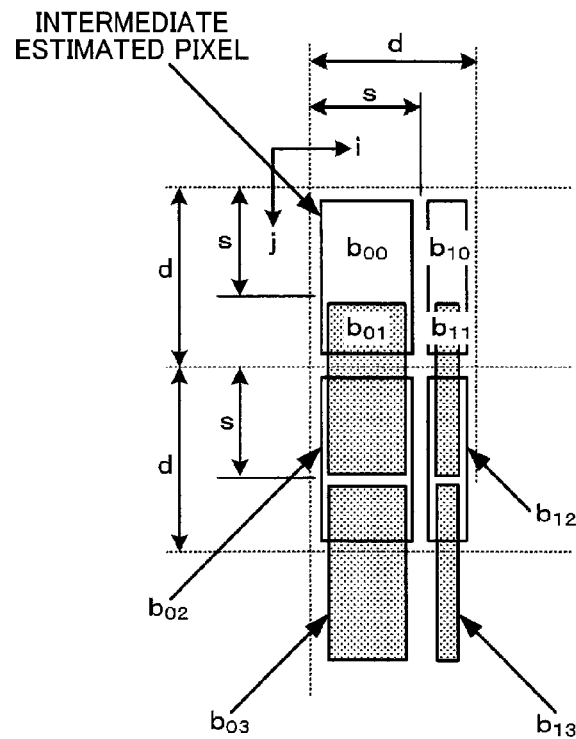
FIG. 34 is a view illustrating an intermediate pixel value used to calculate an estimated pixel value during the third high-resolution estimation process.

As illustrated in FIG. 33, the intermediate pixel values $\{b_{00}, b_{10}, b_{20}, b_{30}, b_{40}\}$ that are within the possible ranges when the detected pixel values $\{a_{00}, a_{10}, a_{20}, a_{30}\}$ are provided and at which the value of the evaluation function $e_b$ (see the expression (29)) becomes a minimum are calculated for the same reasons as those described above with reference to FIG. 24 (second high-resolution estimation process).

Note that the evaluation function $e_b$ may be calculated by the following expression (30) to reduce the amount of calculations.

$$e_b=(b_{00}-b_{00}')^2+(b_{10}-b_{10}')^2+(b_{20}-b_{20}')^2+(b_{30}-b_{30}')^2+(b_{40}-b_{40}')^2 \qquad (30)$$

The intermediate pixel values $\{b_{01}, b_{11}, b_{21}, b_{31}, b_{41}\}$ (see FIG. 31), $\{b_{02}, b_{12}, b_{22}, b_{32}, b_{42}\}$, and $\{b_{03}, b_{13}, b_{23}, b_{33}, b_{43}\}$ are calculated by the above process.

Figure 35:
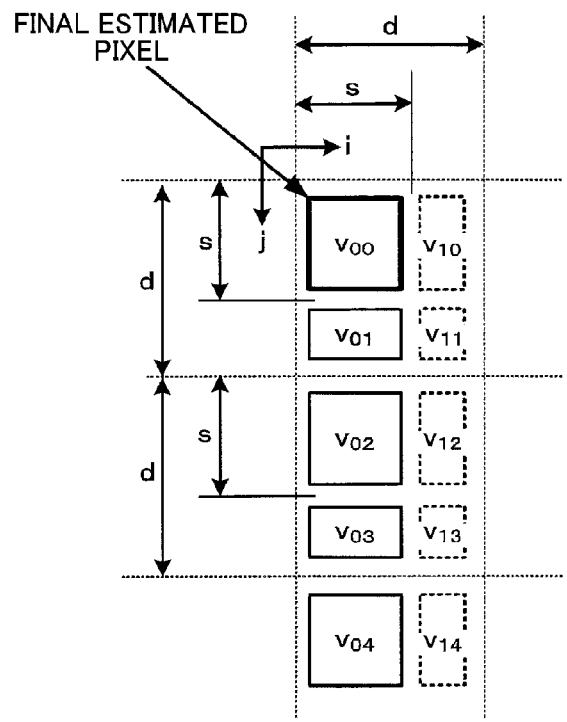
FIG. 35 is a view illustrating an estimated pixel value estimated by the third high-resolution estimation process.

A method that calculates the final estimated pixel values from the intermediate pixel values $\{b_{00}, b_{10}, b_{20}, b_{30}, b_{40}\}$ to $\{b_{03}, b_{13}, b_{23}, b_{33}, b_{43}\}$ is described below. As illustrated in FIG. 35, the final estimated pixel values are provided in the vertical direction in the overlapping area and the non-overlapping area of the intermediate pixels. A method that calculates the final estimated pixel values $\{v_{00}, v_{01}, v_{02}, v_{03}, v_{04}\}$ using the intermediate pixel values $\{b_{00}, b_{01}, b_{02}, b_{03}\}$ in the first column is described below as a representative example.

The intermediate pixel values $\{b_{00}, b_{01}, b_{02}, b_{03}\}$ are obtained by overlap-shift sampling in the vertical direction by an arbitrary shift amount s. Therefore, the intermediate pixel values $\{b_{00}, b_{01}, b_{02}, b_{03}\}$ are considered to be the addition values of adjacent pixel values among the final estimated pixel values $\{v_{00}, v_{01}, v_{02}, v_{03}, v_{04}\}$ (see the following expression (31)).

$$b_{00}=v_{00}+v_{01},$$

$$b_{01}=v_{01}+v_{02},$$

$$b_{02}=v_{02}+v_{03},$$

$$b_{03}=v_{03}+v_{04} \qquad (31)$$

A relational expression of the final estimated pixel values $\{v_{00}, v_{01}, v_{02}, v_{03}, v_{04}\}$ can be derived from the expression (31) as shown below where the final estimated pixel value $v_{00}$ is an unknown (dominant variable) (see the following expression (32)).

$$v_{00}=\text{unknown},$$

$$v_{01}=b_{00}-v_{00},$$

$$v_{02}=v_{00}+(b_{01}-b_{00}),$$

$$v_{03}=b_{02}-v_{02},$$

$$V_{04}=b_{03}-v_{03} \qquad (32)$$

The estimated pixel values $\{v_{00}, v_{00}, v_{02}, v_{03}, v_{04}\}$ may have a different relationship (combination pattern) (see the expression (32)). A method that calculates the combination pattern with the maximum likelihood using the intermediate pixel values $\{b_{00}, b_{01}, b_{02}, b_{03}\}$ is described below.

As illustrated in FIG. 35, the estimated pixel values $\{v_{00}, v_{01}, v_{02}, v_{03}, v_{04}\}$ differ in the sampling aperture size with respect to the captured image. It is considered that values that are weighted by the sampling aperture size are obtained as the estimated pixel values $\{v_{00}, v_{01}, v_{02}, v_{03}, v_{04}\}$ with high probability on average (stochastically) for the reasons described above with reference to FIG. 22 and the expression (15) (second high-resolution estimation process). Specifically, when the intermediate pixel values $\{b_{00}, b_{01}, b_{02}, b_{03}\}$ have been provided, the weighting coefficients $c_3$ and $c_4$ are calculated by the following expression (33) taking account of the aperture occupancy of the estimated pixel value with respect to the intermediate pixel value. Note that $0<s<d$, $0<c_3<1$, and $0<c_4<1$.

$$c_3=v_{00}/b_{00}=s^2/(s \times d),$$

$$c_4=v_{01}/b_{00}=[s \times (d-s)]/(s \times d) \qquad (33)$$

The reference values (i.e., values expected with high probability) $\{v_{00}', v_{01}', v_{01}'', v_{02}', v_{02}'', v_{03}', v_{03}'', v_{04}'\}$ of the estimated pixel values $\{v_{00}, v_{01}, v_{02}, v_{03}, v_{04}\}$ are given by the following expression (34) (see the expression (33)). Note that the weighting coefficients $c_3$ and $c_4$ may be considered to be the sensitivity ratio of the estimated pixel values with respect to the intermediate pixel values. In this case, the weighting coefficients $c_3$ and $c_4$ may be calculated in advance taking account of the characteristics of the image sensor.

$$v_{00}'=c_3 \cdot b_{00},$$

$$v_{01}'=c_4 \cdot b_{00}, v_{01}''=c_4 \cdot b_{01},$$

$$v_{02}'=c_3 \cdot b_{01}, v_{02}''=c_3 \cdot b_{02},$$

$$v_{03}'=c_4 \cdot b_{02}, v_{03}''=c_4 \cdot b_{03},$$

$$v_{04}'=c_3 \cdot b_{03} \qquad (34)$$

Figure 36:
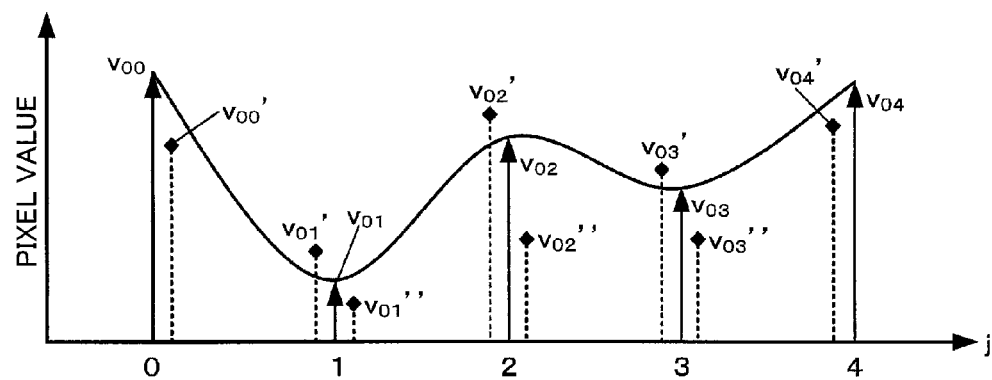
FIG. 36 is a view illustrating an estimated pixel value calculation process used for the third high-resolution estimation process.

As illustrated in FIG. 36, the combination pattern of the estimated pixel values $\{v_{00}, v_{01}, v_{02}, v_{03}, v_{04}\}$ (see the expression (32)) is compared with the reference values $\{v_{00}', v_{01}', v_{01}'', v_{02}', v_{02}'', v_{03}', v_{03}'', v_{04}'\}$ (see the expression (34)), and the estimated pixel values $\{v_{00}, v_{01}, v_{02}, v_{03}, v_{04}\}$ that minimize an error are specified as the estimated values with reasonable likelihood. Specifically, an error evaluation function $e_v$ is calculated by substituting the expression (32) into the following expression (35), the unknown $v_{00}$ at which the value of the evaluation function $e_v$ becomes a minimum is determined, and the determined estimated pixel value $v_{00}$ is substituted into the expression (32) to calculate the estimated pixel values $\{v_{00}, v_{01}, v_{02}, v_{03}, v_{04}\}$.

$$e_v=(v_{00}-v_{00}')^2+(v_{01}-v_{01}')^2+(v_{01}-v_{01}'')^2+(v_{02}-v_{02}')^2+(v_{02}-v_{02}'')^2+(v_{03}-v_{03}')^2+(v_{03}-v_{03}'')^2+(v_{04}-v_{04}')^2 \qquad (35)$$

Figure 37:
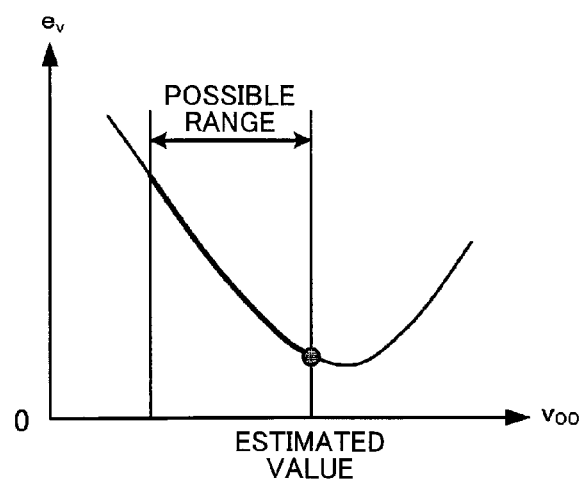
FIG. 37 is a view illustrating an estimated pixel value calculation process used for the third high-resolution estimation process.

As illustrated in FIG. 37, the estimated pixel values $\{v_{00}, v_{01}, v_{02}, v_{03}, v_{04}\}$ that are within the possible ranges when the intermediate pixel values $\{b_{00}, b_{01}, b_{02}, b_{03}\}$ are provided and at which the value of the evaluation function $e_v$ (see the expression (35)) becomes a minimum are calculated for the same reasons as those described above with reference to FIG. 28 (second high-resolution estimation process).

Note that the evaluation function $e_v$ may be calculated by the following expression (36) to reduce the amount of calculations.

$$e_v = (v_{00} - v_{00}')^2 + (V_{01} - v_{01}')^2 + (v_{02} - v_{02}')^2 + (v_{03} - v_{03}')^2 + (v_{04} - v_{04}')^2 \quad (36)$$

The final estimated pixel values $\{v_{00}, v_{01}, v_{02}, v_{03}, v_{04}\}$ are thus calculated at the same time. When it is desired to obtain the sampling values in which the aperture of the pixel s×s, and the pixel pitch in the horizontal direction and the vertical direction is s (see FIG. 29B), only the final estimated pixel value $\{v_{00}\}$ among the final estimated pixel values $\{v_{00}, v_{01}, v_{02}, v_{03}, v_{04}\}$ may be used. Specifically, the final estimated pixel values $\{v_{ij}\}$ (i and j are arbitrary pixel addresses) may be sequentially calculated one by one by performing the above estimation method while sequentially implementing a shift in the horizontal direction and the vertical direction.

Although only some embodiments of the invention have been described in detail above, those skilled in the art will readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings. The configuration and the operation of the imaging control section, the image conversion section, the estimation calculation section, the pixel value conversion section, the imaging device, and the like are not limited to those described in connection with the above embodiments. Various modifications and variations may be made.

What is claimed is:

1. An imaging device comprising:
an image sensor that includes an array of pixels that respectively correspond to a plurality of colors;
an imaging control section that performs a control process that acquires a captured image while mechanically sequentially shifting a position of an object image on the image sensor by a shift amount that is smaller than a pixel pitch of the image sensor;
an image conversion section that calculates luminance values and color difference values based on pixel values of the acquired captured image that respectively correspond to the plurality of colors, and outputs a luminance image formed by the calculated luminance values and a color difference image formed by the calculated color difference values;
an estimation calculation section that calculates an estimated luminance value of each pixel of a high-resolution image having a resolution higher than a resolution obtained by the pixel pitch of the image sensor based on the luminance image, and calculates an estimated color difference value of each pixel of the high-resolution image based on the color difference image; and
a pixel value conversion section that converts the estimated luminance value and the estimated color difference value into RGB pixel values of each pixel of the high-resolution image,
wherein a range that includes a plurality of pixels of the high-resolution image is set to be an addition unit, a pixel value that corresponds to a first addition unit is set to be a first pixel value, a pixel value that corresponds to a second addition unit is set to be a second pixel value, and the first addition unit and the second addition unit overlap each other,
wherein the luminance image or the color difference image is input to the estimation calculation section as an input image,
wherein the first pixel value and the second pixel value are pixel values obtained by pixel values of the input image, or obtained by interpolation based on the input image, and
wherein the estimation calculation section calculates a difference value between the first pixel value and the second pixel value, and calculates the estimated luminance value or the estimated color difference value as an estimated pixel value based on the difference value.

2. The imaging device as defined in claim 1,
a basic block that forms the array of pixels of the image sensor including pixels that respectively correspond to first to kth colors (k is a natural number equal to or larger than 2) as the plurality of colors,
the image conversion section setting a conversion unit that includes pixel values of the first to kth colors based on the captured image, and converts the pixel values included in the conversion unit into the luminance value and the color difference value, and
the estimation calculation section calculating the estimated luminance value based on a plurality of the luminance images obtained by the shift, and calculating the estimated color difference value based on a plurality of the color difference images obtained by the shift.

3. The imaging device as defined in claim 2,
the array of pixels being a Bayer array that includes 2×2 pixels including an R pixel, two G pixels, and a B pixel as the basic block, and
the image conversion section setting the conversion unit that includes 2×2 pixels of the captured image, and converting RGB pixel values of the conversion unit into the luminance value and the color difference value.

4. The imaging device as defined in claim 3,
the image conversion section setting a plurality of the conversion units, positions of the 2×2 pixels of the plurality of conversion units being sequentially shifted by one pixel in a horizontal direction or a vertical direction.

5. The imaging device as defined in claim 2,
the array of pixels being a Bayer array that includes 2×2 pixels including an R pixel, two G pixels, and a B pixel as the basic block, and
the image conversion section calculating RGB pixel values of each pixel of the captured image by interpolation, setting the RGB pixel values of each pixel to be the conversion unit, and converting the RGB pixel values of the conversion unit into the luminance value and the color difference value.

6. The imaging device as defined in claim 2,
the array of pixels being a Bayer array that includes 2×2 pixels including an R pixel, two G pixels, and a B pixel as the basic block, and
the image conversion section calculating RGB pixel values of each pixel of the captured image by interpolation, setting the conversion unit that includes 2×2 pixels of the captured image, calculating an addition value of four R pixel values of the conversion unit, an addition value of four G pixel values of the conversion unit, and an addition value of four B pixel values of the conversion unit, and converting the calculated addition values into the luminance value and the color difference value.

7. The imaging device as defined in claim 6,
the image conversion section setting a plurality of the conversion units, positions of the 2×2 pixels of the plurality of conversion units being sequentially shifted by one pixel in a horizontal direction or a vertical direction.

8. The imaging device as defined in claim 1,
the pixel pitch being p, and the shift amount in a horizontal direction and a vertical direction being p/m (m is a natural number equal to or larger than 2),
the imaging control section implementing a first shift to an nth shift (n is a natural number equal to or larger than 2) that make a round trip,
the estimation calculation section receiving a first luminance image to an nth luminance image or a first color difference image to an nth color difference image corresponding to the first shift to the nth shift as a first input image to an nth input image, and calculating the estimated luminance value or the estimated color difference value as an estimated pixel value, and
pixels of the first input image to the nth input image being pixels that correspond to m×m pixels of the high-resolution image, and being pixels that are sequentially shifted in position on the high-resolution image corresponding to the shift by the shift amount p/m.

9. The imaging device as defined in claim 8,
the imaging control section implementing the first shift that corresponds to a reference position, a second shift that is a shift from the reference position by a shift amount p/2 in a horizontal direction, a third shift that is a shift from the reference position by the shift amount p/2 in the horizontal direction and a vertical direction, and a fourth shift that is a shift from the reference position by the shift amount p/2 in the vertical direction, and
the estimation calculation section calculating the estimated pixel value corresponding to a pixel count 2×2 times that of the captured image from the first input image to a fourth input image that respectively correspond to the first shift to the fourth shift.

10. The imaging device as defined in claim 8,
the imaging control section implementing the first shift that corresponds to a reference position, and a second shift that is a shift from the reference position by a shift amount p/2 in a horizontal direction and a vertical direction, and
the estimation calculation section calculating a first interpolated image that corresponds to the shift from the reference position by the shift amount p/2 in the horizontal direction, and a second interpolated image that corresponds to the shift from the reference position by the shift amount p/2 in the vertical direction based on the first input image and a second input image, and calculating the estimated pixel value corresponding to a pixel count 2×2 times that of the captured image from the first input image, the second input image, the first interpolated image, and the second interpolated image.

11. The imaging device as defined in claim 1,
the estimation calculation section generating a relational expression of a first intermediate pixel value and a second intermediate pixel value using the difference value, estimating the first intermediate pixel value and the second intermediate pixel value using the relational expression, and calculating the estimated pixel value using the estimated first intermediate pixel value, the first intermediate pixel value corresponding to an addition pixel value of a first area obtained by removing an overlapping area from the first addition unit, and the second intermediate pixel value corresponding to an addition pixel value of a second area obtained by removing the overlapping area from the second addition unit.

12. The imaging device as defined in claim 11,
the estimation calculation section generating a relational expression of intermediate pixel values included in an intermediate pixel value pattern using the first pixel value and the second pixel value, comparing the intermediate pixel value pattern expressed by the relational expression of the intermediate pixel values with the first pixel value and the second pixel value to evaluate similarity, and determining the intermediate pixel values included in the intermediate pixel value pattern based on a similarity evaluation result so that the similarity becomes a maximum, the intermediate pixel value pattern including consecutive intermediate pixel values that include the first intermediate pixel value and the second intermediate pixel value.

13. An image generation method comprising:
acquiring a captured image while mechanically sequentially shifting a position of an object image on an image sensor by a shift amount that is smaller than a pixel pitch of the image sensor, the image sensor including an array of pixels that respectively correspond to a plurality of colors;
calculating luminance values and color difference values based on pixel values of the captured image that respectively correspond to the plurality of colors, and outputting a luminance image formed by the calculated luminance values and a color difference image formed by the calculated color difference values;
calculating an estimated luminance value of each pixel of a high-resolution image having a resolution higher than a resolution obtained by the pixel pitch based on the luminance image, and calculating an estimated color difference value of each pixel of the high-resolution image based on the color difference image; and
converting the estimated luminance value and the estimated color difference value into pixel values of each pixel of the high-resolution image that respectively correspond to the plurality of colors,
wherein a range that includes a plurality of pixels of the high-resolution image is set to be an addition unit, a pixel value that corresponds to a first addition unit is set to be a first pixel value, a pixel value that corresponds to a second addition unit is set to be a second pixel value, and the first addition unit and the second addition unit overlap each other,
wherein the luminance image or the color difference image is input as an input image,
wherein the first pixel value and the second pixel value are pixel values obtained by pixel values of the input image, or obtained by interpolation based on the input image, and
wherein calculating the estimated luminance value or calculating the estimated color difference value comprises:
calculating a difference value between the first pixel value and the second pixel value; and
calculating the estimated luminance value or the estimated color difference value as an estimated pixel value based on the difference value.

* * * * *